United States Patent [19]

Fujimoto et al.

[11] Patent Number: 5,615,976
[45] Date of Patent: Apr. 1, 1997

[54] DOUBLE WALLED PIPE, JACKING METHOD AND PIPE END STRUCTURE OF LEADING PIPE

[75] Inventors: Tomoya Fujimoto; Kenko Okamura; Shigeru Morishita, all of Tokyo; Masaru Murakami; Akira Adachi, both of Chiba; Mitsutoshi Hayashi, Yokohama; Akinari Fujita, Yokohama; Shingo Nagashima, Yokohama; Minoru Kurashina, Yokohama; Kentaro Yoshida, Yokohama, all of Japan

[73] Assignees: Kawasaki Steel Corp., Kobe; Tokyo Gas Co. Ltd., Tokyo, both of Japan

[21] Appl. No.: 302,865

[22] PCT Filed: Sep. 13, 1993

[86] PCT No.: PCT/JP93/01304

§ 371 Date: Sep. 14, 1994

§ 102(e) Date: Sep. 14, 1994

[87] PCT Pub. No.: WO94/20730

PCT Pub. Date: Sep. 15, 1994

[30] Foreign Application Priority Data

| Mar. 5, 1993 | [JP] | Japan | 5-044860 |
| Mar. 25, 1993 | [JP] | Japan | 5-066598 |
| Mar. 25, 1993 | [JP] | Japan | 5-066609 |
| Aug. 2, 1993 | [JP] | Japan | 5-191212 |
| Aug. 2, 1993 | [JP] | Japan | 5-191213 |

[51] Int. Cl.⁶ .................................................. F16L 1/036
[52] U.S. Cl. ................................................................. 405/184
[58] Field of Search ........................... 405/184, 154; 285/133.1, 134; 175/215, 213, 22, 23; 138/113, 114

[56] References Cited

U.S. PATENT DOCUMENTS

| 4,385,668 | 5/1983 | Becker et al. | 175/215 X |
| 5,165,822 | 11/1992 | Hein | 405/184 |
| 5,186,266 | 2/1993 | Heller | 175/215 |

FOREIGN PATENT DOCUMENTS

| 58-38670 | 8/1983 | Japan . | |
| 1256695 | 10/1989 | Japan | 405/184 |
| 493496 | 3/1992 | Japan | 405/184 |

*Primary Examiner*—Hoang C. Dang
*Attorney, Agent, or Firm*—Staas & Halsey

[57] ABSTRACT

There is provided a double walled pipe having an inner pipe and an outer pipe which is movable relative to the inner pipe in a longitudinal direction of the inner pipe. Acting on only the outer pipe with a pipe jacking power makes it possible to bury the double walled pipe, without damaging the rear end of the inner pipe and also generating an internal stress on the inner pipe. Consequently, it is avoided such a situation that even in use pinholes, cracks, etc. occur on the inner pipe, and thus it is possible to expect an execution with higher reliability.

11 Claims, 32 Drawing Sheets

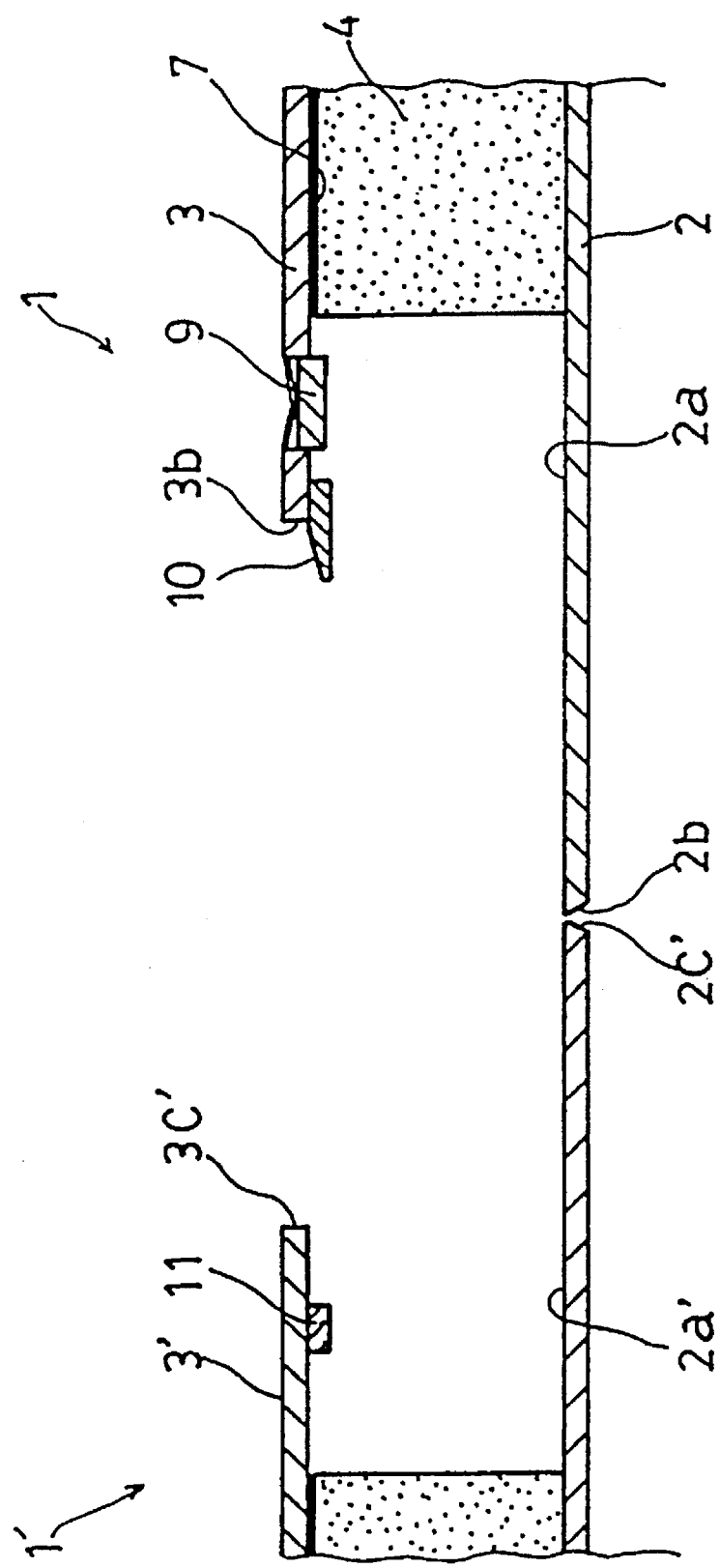

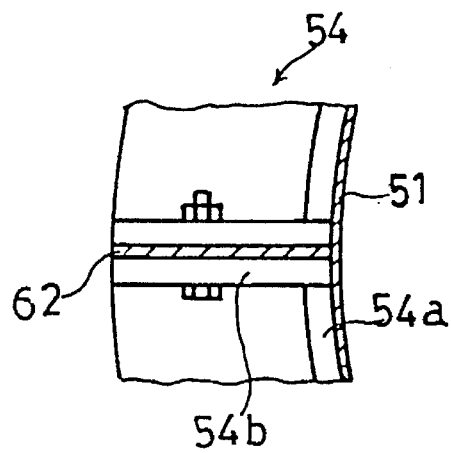
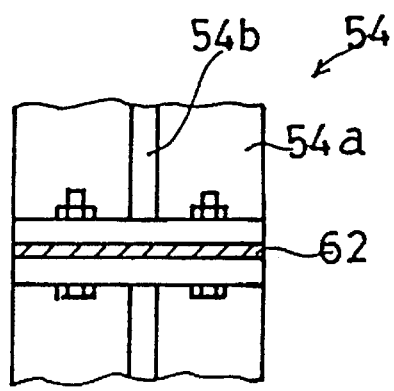
Fig.18(A)  Fig.18(B)
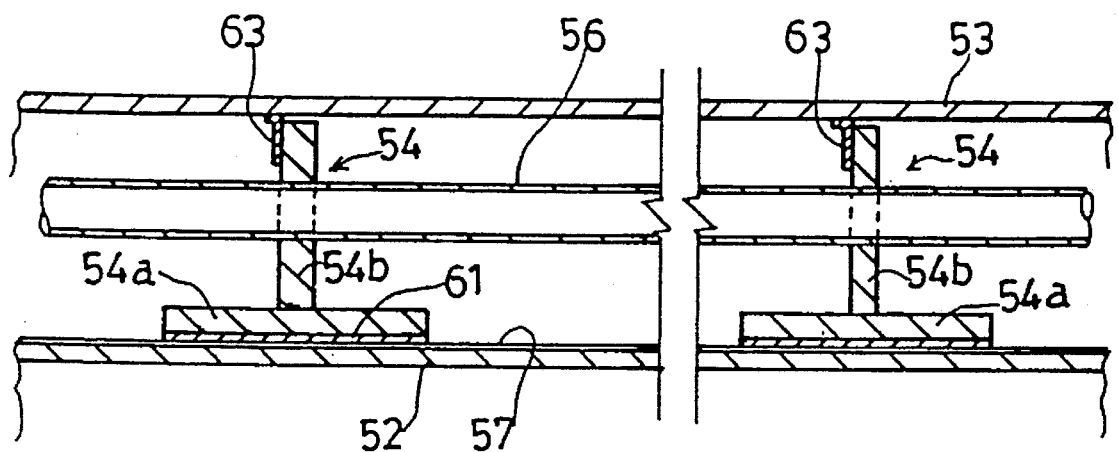
Fig.19

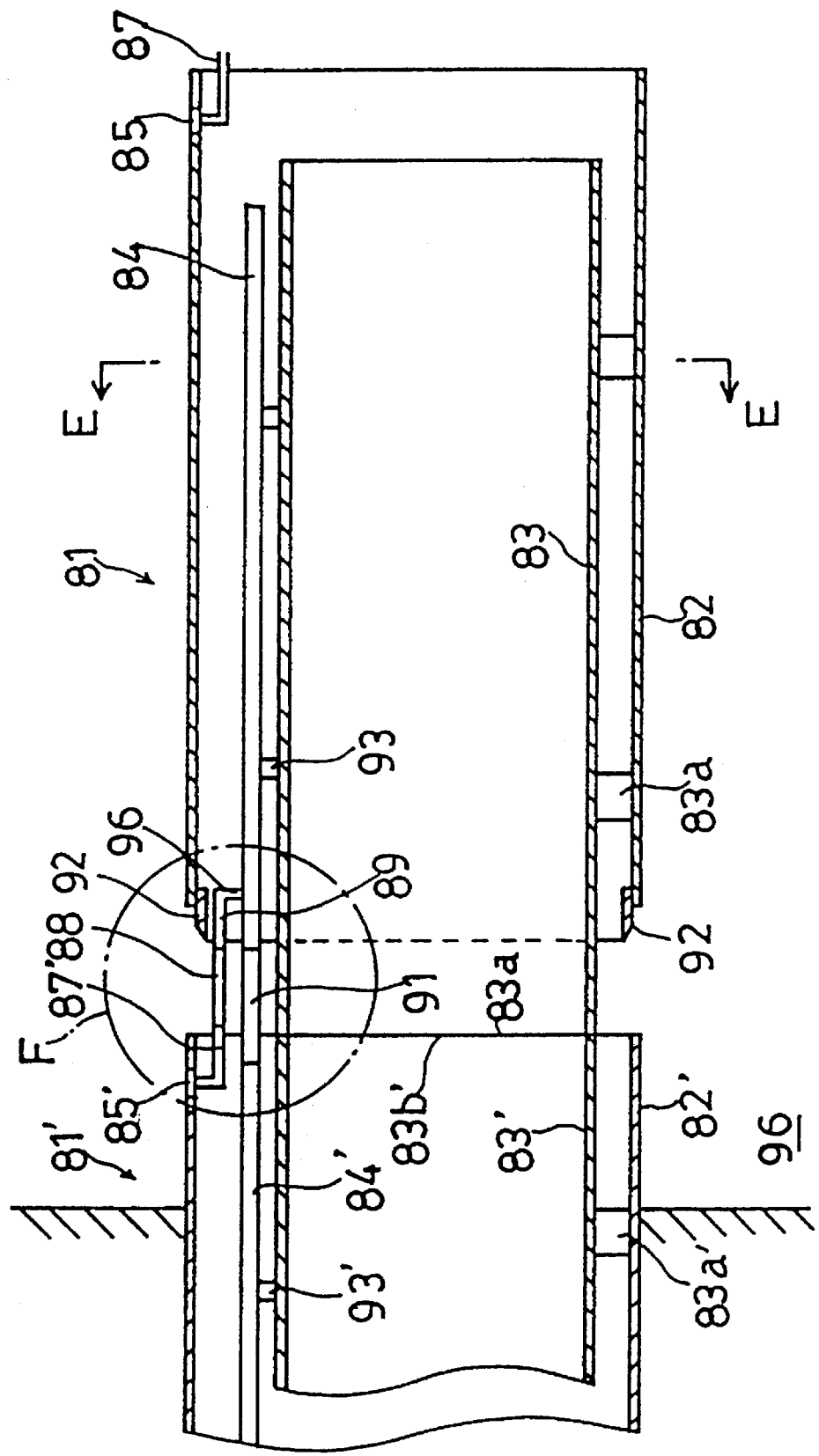

DOUBLE WALLED PIPE, JACKING METHOD AND PIPE END STRUCTURE OF LEADING PIPE

BACKGROUND OF THE INVENTION

1. Field of the Invention

The present invention relates to a double walled pipe, for example, a gas pipe or the like, having a double walled pipe structure, which is suitable for a jacking method in which an object is propelled under the ground to be buried underground, and a jacking method thereof, and further to a pipe end structure of a leading pipe which is used for leading the double walled pipe when it is propelled underground.

2. Description of the Related Art

It happens that as a pipe which is buried underground for transporting, for example, the high pressure gas, a double walled steel pipe is used. In such a double walled steel pipe, there is slushed the concrete or the like the space between the inner pipe and the outer pipe to maintain the strength of the pipe. Further, to bury such a double walled steel pipe under the ground, there may be adopted a so-called jacking method. According to the jacking method, burying of the double walled steel pipe is conducted in such a manner that a predetermined shaft is beforehand dug to propel the double steel pipe from the side wall of the shaft in the longitudinal direction, but not to bury the double walled steel pipe from the ground through open-cut of an elongated groove extended along the burying path.

FIGS. 35(A) and 35(B) are a side elevation and a section view, respectively, showing by way of example the conventional double walled steel pipe which will be used in adoption of the jacking method as described above.

Referring to FIGS. 35(A) and 35(B), a double walled steel pipe 31 basically comprises an inner pipe 33, an outer pipe 35 and a concrete 37 which fills up the space between the inner pipe 33 and the outer pipe 35. Where a front end portion 33a and a back end portion 33b of the inner pipe 33 are not covered by the concrete 37 and thus exposed.

There are prepared a plurality of pieces of such double walled steel pipe 31, and those are propelled underground in a direction as shown by the arrow in the figure. At that time, burying of those pipes is implemented in the following manner. A back end plane 33d of the preceding double walled steel pipe 31 and a front end plane 33c of the subsequent double walled steel pipe 31 are coupled to each other and welded, and then the welded portion is fitted with one having a ring configuration in which a ring is segmented into a plurality of pieces, a back end plane 35b of the outer pipe 35 of the preceding double walled steel pipe 31 and a front end plane 35a of the outer pipe 35 of the subsequent double walled steel pipe 31 are jointed each other, and the thrust is applied to the back end plane 33d of the inner pipe 33 of the subsequent double walled steel pipe 31 and the back end plane 35b of the outer pipe 35 of the subsequent double walled steel pipe 31 so that the subsequent double walled steel pipe 31 may propel in an arrow direction shown in FIG. 35 (A). This process is repeatedly conducted over and over. As a result, the coupled double walled steel pipes 31 are buried under the ground.

The use of the above-mentioned conventional double walled steel pipes, however, suffers from the following drawbacks. The propulsion of the double walled steel pipes may cause the back end plane 33d of the inner pipe 33 to be bent or injured, for example. Thus, prior to welding this together the inner pipe of the subsequent double walled steel pipe, there will be needed a process for reshaping the back end plane 33d. Further, the propulsion of the double walled steel pipes may cause the internal stress to be derived on the inner pipe 33. Thus, there is a fear such that for example, pinholes, clacks or the like will occur on the inner pipes, while the double walled steel pipes are buried underground and used.

In the jacking method adopting the above-mentioned double walled steel pipes 31, it is preferable from the view point of strength to fill up with the cement milk the space between the inner pipe 33 and the outer pipe 35 (or the fitted one in a ring shape) at a coupling portion of the double walled steel pipe 31 to the double walled steel pipe 31. However, it would be difficult to completely fill up the space without any gap. Thus, it happens that steel segments are inserted in a circumferential shape, without conducting filling up, and then the double walled steel pipes are propelled. This case will, however, involve the problem as to the strength of the coupling portion of the double walled steel pipes.

Further, as another jacking method of burying the double walled pipes, there is known a method in which only the outer pipe is propelled under the ground, in order to prevent the occurrence of flaws on the inner pipe through which gas or water will flow, and thereafter the inner pipe is fed or forced into the outer pipe, and then the concrete or mortar is injected into the gap between the inner pipe and the outer pipe to fix the inner pipe and the outer pipe together. According to this method, as mentioned above, there are needed two processes, one of which is for propelling the outer pipe under the ground, and another for feeding or forcing the inner pipe into the propelled outer pipe. Thus, according to this method, it takes much time, and in addition the cost for construction will be increased. Therefore, according to this method, from the view point of the cost, it is common that a concrete pipe (Hume pipe) is used as the outer pipe.

SUMMARY OF THE INVENTION

In view of the foregoing, it is therefore an object of the present invention to provide a double walled pipe capable of propelling free from occurrence of the internal stress on the inner pipe, and a jacking method using such a double walled pipe.

It is another object of the present invention to provide a pipe end structure of a leading pipe which is used for leading the double walled pipe when it is propelled underground.

To achieve the above-mentioned objects, according to the present invention, there is provided a double walled pipe comprising: an inner pipe; and an outer pipe which is movable relative to said inner pipe in a longitudinal direction of said inner pipe.

As the outer pipe and the inner pipe, applicable are a concrete pipe (Hume pipe), a concrete steel pipe, a cast iron, a resin pipe, a resin coated steel pipe, a steel pipe, a square-shape pipe, etc.

It is preferable that a front end portion or a back end portion of said outer pipe is equipped with a guide member for guiding a tip of said outer pipe to be moved relative to said inner pipe, said guide member being adapted to conduct an effective coupling of a preceding double walled pipe with a subsequent double walled pipe.

It is preferable that said guide member includes: a ring member having a part inserted into one end of said outer pipe and fixed to said outer pipe and other part to be inserted into another outer pipe which is to be coupled with said outer pipe, said other part being projected from said outer pipe in a longitudinal direction of said outer pipe and being provided with a groove surrounding the periphery of the ring member; and an O-ring having a flexibility for sealing a coupling portion of outer pipe-to-outer pipe, said O-ring being engaged with said groove.

It is preferable that said ring member is formed, at a tip end to be inserted into said other outer pipe, with a taper section which is gradually reduced toward the tip end.

It is preferable that said outer pipe is equipped with a check valve for permitting a one-way flow from an interior of said outer pipe towards an exterior.

Here, as one (hereinafter, referred to as a "first aspect") of the preferable aspects of a double walled pipe according to the present invention, it is acceptable that a double walled pipe according to the present invention is so arranged that there is provided, between said inner pipe and said outer pipe, an intercalary material for covering the periphery of said inner pipe in such a manner that the front end portion and back end portion of said inner pipe are exposed. As the intercalary material, for example, concrete and mortar, etc. are available.

In this case, it is preferable to provide a lubricating layer and/or a cushion material such as styrene foam, a corrugated sheet and the like between an outer wall of said intercalary material and an inner wall of said outer pipe. Otherwise, it is acceptable to provide a lubricating layer between an inner wall of said intercalary material and an outer wall of said inner pipe, and in case where said intercalary material is composed of a plurality of layers, between the layer-to-layer which are adjacent to each other.

It is acceptable that the lubricating layer is a lubricating agent such as a lubricating oil, also a chemical resin, for example, polypropylene, which serves to reduce a sliding resistance between the outer pipe and the inner pipe, still also a pipe-shape object in which a metal or the like is formed in a pipe configuration, still also both the lubricating agent and the pipe-shape object. Incidentally, in case where the pipe-shape object is adopted, it is acceptable to provide such an arrangement that the pipe-shape object is fixed to an inner wall of the outer pipe so as to be slidingly movable together with the outer pipe with respect to the intercalary material, otherwise, to provide such an arrangement that the pipe-shape object is fixed to the intercalary material so that the outer pipe may slidingly move with respect to the pipe-shape object, still otherwise, to provide such an arrangement that the pipe-shape object is fixed to none of the outer pipe and the intercalary material, so that when the outer pipe is slidingly moved with respect to the intercalary material, the pipe-shape object is slidingly moved with respect to both the outer pipe and the intercalary material.

It is preferable that said cushion material is made of a styrene foam.

It is preferable that said cushion material is a corrugated sheet, and a barrier material is provided between said corrugated sheet and said intercalary material.

It is acceptable in the arrangement including said corrugated sheet and said barrier material that said barrier material is fixed to said corrugated sheet, and at least front end plane, with respect to a pipe jacking direction, of said corrugated sheet is capped with a watertight cap.

It is preferable that there is provided, between said inner pipe and said outer pipe, an intercalary material for covering the periphery of said inner pipe in such a manner that the front end portion and back end portion of said inner pipe are exposed; and said intercalary material is equipped with a grout hose insertion hole extending in a longitudinal direction of said double walled pipe.

Here, as another (hereinafter, referred to as a "second aspect") of the preferable aspects of a double walled pipe according to the present invention, it is acceptable that a double walled pipe according to the present invention is so arranged that there is provided, between said inner pipe and said outer pipe, a ring member surrounding the periphery of said inner pipe, said ring member being fixed to said inner pipe; and said outer pipe is supported in such a way that it is slidingly movable with respect to said ring member.

In this case, it is preferable that said ring member is equipped with a grout hose insertion hole, and said double walled pipe further comprises a grout hose extending through said grout hose insertion hole in a longitudinal direction of said double walled pipe.

Otherwise, it is acceptable to provide such an arrangement that said ring member is equipped with an insertion opening into which a grout hose insertion tube is inserted, and said double walled pipe further comprises a grout hose insertion tube having a filling agent flow hole, extending through said insertion opening in a longitudinal direction of said double walled pipe.

It is acceptable in the arrangement including said grout hose insertion tube that said grout hose insertion tube is equipped with said filling agent flow hole only at the front end portion and/or the back end portion of said grout hose insertion tube.

Here, still as another (hereinafter, referred to as a "third aspect") of the preferable aspects of a double walled pipe according to the present invention, it is acceptable that a double walled pipe according to the present invention is so arranged that the double walled pipe further comprises: a plurality of rib bands each having at least one elliptic hole extending in a peripheral direction of said inner pipe, each of said rib bands surrounding an outer periphery of said inner pipe, and penetrating in a longitudinal direction of said inner pipe; and a plurality of auxiliary pipe arrangements each inserted into the elliptic hole of the associated rib band in such a manner that it is slidingly movable with respect to said elliptic hole, wherein said auxiliary pipe arrangements have each a first coupling section and a second coupling section at a front end portion and back end portion, with respect to a propellent direction, of the auxiliary pipe arrangement, respectively, said first coupling section being coupled with a back end portion, with respect to the pipe jacking direction, of a preceding double walled pipe, and said second coupling section being coupled with a front end portion, with respect to the pipe jacking direction, of a subsequent double walled pipe.

In this case, said first coupling section and said second coupling section are each typically equipped with a male screw and a female screw which are adapted for screw-operating each other.

Here, still as another (hereinafter, referred to as a "fourth aspect") of the preferable aspects of a double walled pipe according to the present invention, it is acceptable that a double walled pipe according to the present invention is so arranged that the double walled pipe further comprises: a first check valve for permitting a one-way flow of a back filling material from an interior of said outer pipe towards an exterior, a filling tube extending between said outer pipe and said inner pipe in their longitudinal direction, a second check valve for permitting a one-way flow of a back filling material from an interior of said filling tube towards an exterior, a first back filling tube, one end of which is connected to said first check valve, extending from said first check valve to backwards with respect to a pipe jacking direction, and a second back filling tube, one end of which is connected to said second check valve, extending from said second check valve to forwards with respect to the pipe jacking direction, wherein said first check valve of a preceding double walled pipe and said second check valve of a subsequent double walled pipe are connected through said first back filling tube of the preceding double walled pipe and said second back filling tube of the subsequent double walled pipe and in addition through a connection tube at least a part of which has a flexibility. In this case, it is acceptable to provide such an arrangement that a plurality of said first check valves are provided in a longitudinal direction of said outer pipe, and said second back filling tube is connected to the plurality of said first check valves.

Further, according to the present invention, there is provided a jacking method of propelling underground through a side wall of a shaft a double walled pipe comprising an inner pipe, and an outer pipe which is movable relative to said inner pipe in a longitudinal direction of said inner pipe, comprising the steps of:

connecting a back end portion of an inner pipe of a preceding double walled pipe of which a rear end projects to the shaft with a front end portion of an inner pipe of a subsequent double walled pipe to be newly propelled;

moving forwards said outer pipe of the subsequent double walled pipe with respect to said inner pipe to couple a front end plane of said outer pipe of the subsequent double walled pipe with a back end plane of said outer pipe of the preceding double walled pipe; and propelling underground the subsequent double walled pipe upon acting a jacking power on said outer pipe of the subsequent double walled pipe, but upon acting no jacking power on said inner pipe of the subsequent double walled pipe.

Here, as a first aspect of the above-defined jacking method according to the present invention, wherein said double walled pipe further comprising an intercalary material, provided between said inner pipe and said outer pipe, for covering the periphery of said inner pipe in such a manner that the front end portion and back end portion of said inner pipe are exposed, and a grout hose insertion hole extending in a longitudinal direction, it is acceptable that said method further comprises the steps of:

connecting a rear end of a grout hose exposed from an opening of a back end of said grout hose insertion hole of a preceding double walled pipe with a tip of a grout hose exposed from an opening of a front end of said grout hose insertion hole of a subsequent walled double pipe, said grout hose connection step being conducted between said inner pipe connection step and said outer pipe moving step; and filling with a filling material a space between said inner pipes and said outer pipes of the connected double walled pipes each other, by means of slushing the filling material into the connected grout hoses each other, after repetition of said inner pipe connection step, said grout hose connection step, said outer pipe moving step and said pipe jacking step in connection with a plurality of said double walled pipes.

In said filling step, it is preferable that the filling is executed in such a manner that while the connected grout hoses each other are sequentially drawn, the rear end of the grout hoses is sequentially positioned at the connected portions of said connected double walled pipes so that the connected portions are filled with the filling material.

In the first aspect of the above-defined jacking method according to the present invention, it is acceptable to adopt such a scheme that in mid course of the repetition of said inner pipe connection step, said grout hose connection step, said outer pipe moving step and said pipe jacking step in connection with a plurality of said double walled pipes, there is set up, after said inner pipe connection step, a step of executing said outer pipe moving step omitting said grout hose connection step; and in said filling step, the grout hoses are drawn from both sides of the front and rear of the pipe jacking direction.

Here, as a second aspect of the above-defined jacking method according to the present invention, it is acceptable that said method is characterized in that said inner pipe connection step, said outer pipe moving step and said pipe jacking step are repeatedly executed in connection with a plurality of said double walled pipes, so that there is formed such a state that a back end portion of an outer pipe of said double walled pipe finally coupled is exposed in said shaft while said inner pipe is projected by a predetermined length from the back end portion of said outer pipe;

the back end portion of said double walled pipe finally coupled, which takes said state, is capped with a protection tube of which one end is closed with a cover, said protection tube having a diameter same as the outer pipe and a depth exceeding said predetermined length;

a bearing wall is constructed for covering the back end portion of said double walled pipe finally coupled, which takes said state, and said protection tube with which said back end portion is capped, said bearing wall being contact with said side wall; and said inner pipe connection step, said outer pipe moving step and said propelling step are repeatedly executed in connection with a plurality of said subsequent double walled pipes, while causing said bearing wall to bear a reaction force of a jacking, so that the plurality of said subsequent double walled pipes are propelled underground from a side wall which is located over against said side wall.

In the second aspect of the above-defined jacking method according to the present invention, it is preferable that before the back end portion of said double walled pipe finally coupled, which takes said state, is capped with the protection cap, a back end portion of an inner pipe of said double walled pipe finally coupled is capped with a protection cap which is spaced from the protection cap when installed.

Still further, according to the present invention, there is provided a pipe end structure of a leading a pipe for leading a double walled pipe, which comprises an inner pipe, and an outer pipe which is movable relative to said inner pipe in a longitudinal direction of said inner pipe, when said double walled pipe is propelled underground, said pipe end structure said leading pipe comprising:

a dummy pipe which is set up, when jacking, at the rear of an excavation apparatus with respect to an excavation direction, and is withdrawn after jacking; and an adapter tube of which a front end is fixed to the rear of said dummy pipe with respect to the excavation direction, said adapter tube having a rear end to which fixed is an insertion joint for positioning the outer pipe of said double walled pipe with insertion into the front end inside of said double walled pipe, and an inside to which fixed is a stopper for positioning said inner pipe.

A double walled pipe according to the present invention has an inner pipe and an outer pipe which is movable relative to the inner pipe in a longitudinal direction of the inner pipe. Acting on only the outer pipe with a jacking power, using the jacking method according to the present invention, makes it possible to bury the double walled pipe, without damaging the rear end of the inner pipe and generating an internal stress on the inner pipe as well. Consequently, it is avoided such a situation that even in use pinholes, cracks, etc. occur on the inner pipe, and thus it is possible to expect an execution with higher reliability.

According to the present invention, the double walled pipe is provided with the above-mentioned guide member. This features makes it possible, when the outer pipe is slid, to absorb an error in misaligment between the outer pipe-to-outer pipe, thereby coupling the tip-to-tip of the outer pipes with greater accuracy.

The guide member includes a ring member having a part inserted into one end of said outer pipe and fixed to said outer pipe and other part to be inserted into another outer pipe which is to be coupled with said outer pipe, said other part being projected from said outer pipe in a longitudinal direction of said outer pipe. This feature makes it possible to couple the outer pipe-to-outer pipe to be coupled with greater accuracy, upon positioning therebetween. Further, there are provided a groove surrounding the periphery of the ring member and an O-ring engaged with said groove. Hence, in a state that the ring member is inserted into the outer pipe, the O-ring is in contact with the inner periphery of the outer pipe, so that the O-ring seals the coupling portion of the outer pipe-to-outer pipe. Furthermore, the ring member is formed, at a tip end to be inserted into said other outer pipe, with a taper section which is gradually reduced toward the tip end. This feature makes it possible to facilitation an insertion of the ring member into the inner of the outer pipe.

According to the double walled pipe of the present invention, the outer pipe is equipped, at the front end or the rear end, with a check valve for permitting a one-way flow from an interior of said outer pipe towards an exterior. This prevents water or earth and sand from entering the space between the inner pipe and the outer pipe during a pipe jacking. Even if those foreign objects entered, they will be discharged outside of the outer pipe by a filling pressure in filling of the filling material. Hence, the filling material goes sufficiently around the space between the inner pipe and the outer pipe. Also the filling material itself flows out of the outer pipe through the check valve, so that the over break space also near the outer wall of the outer pipe is filled with the filling material, thereby providing the buried pipe with greater toughness.

Further, in the first aspect of the double walled pipe according to the present invention, there is provided, between said inner pipe and said outer pipe, an intercalary material for covering the periphery of said inner pipe in such a manner that the front end portion and back end portion of said inner pipe are exposed; and a lubricating layer is provided in at least one selected from among spaces between an outer wall of said intercalary material and an inner wall of said outer pipe, between an inner wall of said intercalary material and an outer wall of said inner pipe, and in case where said intercalary material is composed of a plurality of layers, between the layer-to layer which are adjacent to each other. The provision of the lubricating layer makes it possible to reduces a sliding resistance between the outer pipe and the intercalary material, thereby permitting the outer pipe to be reliably slidingly moved.

Furthermore, in the first aspect of the double walled pipe according to the present invention, there is provided a layer constructed of a cushion material is provided between an outer wall of said intercalary material and an inner wall of said outer pipe. The provision of the cushion material of layer makes it possible, when a misalignment between the outer pipe-to-outer pipe or an error in size exists in their coupling, to absorb those drawbacks, thereby reliably coupling the tip-to-tip of the outer pipes.

In this case, the provision of not only the cushion material of layer but also the guide member may provide a double walled pipe which is more excellent in execution.

In a case where said cushion material is made of a styrene foam, it is acceptable to provide such an arrangement that the sytrene foam is fixed to an inner wall of the outer pipe so as to be slidingly movable together with the outer pipe with respect to the intercalary material, otherwise to provide such an arrangement that the styrene foam is fixed to none of the outer pipe and the intercalary material, so that when the outer pipe is slidingly moved with respect to the intercalary material, the styrene foam is slidingly moved with respect to both the outer pipe and the intercalary material.

In a case where a corrugated sheet is used as the cushion material, if there are adopted, as the intercalary material, objects which show a flowability at an initial stage, for example, concrete, mortar, etc., the intercalary material will creep in the groove of the corrugated sheet. Hence, the corrugated sheet does not serve as the cushion material of layer. Thus, in order to cope with this problem, a barrier material is provided between the corrugated sheet and the intercalary material, so that the corrugated sheet may serve as the intercalary material.

Also with respect to a sliding in a case where the corrugated sheet is provided as the cushion material of layer, it is the same as that in a case where the styrene foam is provided as the cushion material of layer, and thus it is acceptable to provide an arrangement permitting a sliding in any one or more selected from among spaces between the outer pipe and the corrugated sheet, the corrugated sheet and the barrier material, and the barrier material and the intercalary material.

To implement the execution, it happens that there is adopted a method in which a grouting disposal is practiced every a connecting portion of two double walled pipes coupled to each other is connected by one place. In a case where the corrugated sheet is provided as the cushion material of layer, if at least the front end plane, with respect to the pipe jacking direction, of the corrugated sheet is equipped with a watertight cap, it is possible to avoid such an inconvenience, which encounters when the subsequent new double walled pipe is connected to the preceding double walled pipe, that when the connected portion is subjected to the grouting disposal, the grouting material is leaked through the space between the outer pipe or the barrier material and the corrugated sheet to the rear end with respect to the pipe jacking direction. Incidentally, in a case where the watertight cap is equipped, the watertight cap will come off through sliding of the corrugated sheet and the barrier material. Hence, the corrugated sheet and the barrier material are fixed. It is preferable that the rear end plane, with respect to the pipe jacking direction, of corrugated sheet is also capped with the watertight cap. This arrangement makes it possible to avoid such a situation that the grout material crepts in the space between the outer pipe or the barrier material and the corrugated sheet when the connected portion is subjected to the grouting disposal, thereby reducing an amount of grouting material to be used.

Further, the double walled pipe according to the present invention is equipped with a grout hose opening. After connection of the inner pipe-to-inner pipe by means of, for example, welding or the like, the grout hoses are connected to each other. This arrangement makes it possible to fill the space between the inner pipes and the outer pipes of the double walled pipes coupled to each other, with the filling material, such as cement milk or the like, which is flowed into the coupled grout hoses together, after a plurality of the double walled pipes are buried underground in accordance with a jacking method. In this case, the cement milk or the like fills up the space between the inner pipes and the outer pipes of the double walled pipes with respect to also the coupled portion thereof, thereby providing the buries pipes with greater toughness.

According to the second aspect of the double walled pipe according to the present invention, there is provided an arrangement which permits a sliding between the ring member and the outer pipe. Acting on only the outer pipe with a jacking power makes it possible to bury the double walled pipe, without damaging the rear end of the inner pipe and also generating an internal stress on the inner pipe. Consequently, it is avoided such a situation that even in use pinholes, cracks, etc. occur on the inner pipe, and thus it is possible to expect an execution with higher reliability.

In the second aspect of the double walled pipe according to the present invention, it is necessarily required that the space between the outer pipe and the inner pipe are filled with the cement milk or the like, in case that the outer pipe is provided with a sufficient rigidity or stiffness. From the view point of a durability, however, it is preferable that the spaces between the outer pipe and the inner pipe are filled with the filling material. In this case, the provision of the grout hose makes it possible to fill up the space between the outer pipe and the inner pipe in such a manner that when the double walled pipe-to-pipe are connected, the grout hose-to-hose are also connected, and after multiple double walled pipes are connected and propelled, a filling agent is supplied to the grout hose while the grout hose is drawn. Alternatively, it is acceptable to provide such an arrangement that instead of the grout hose, the grout hose insertion tube is provided, and when the double walled pipe-to-pipe are connected, the grout hose insertion tube-to-tube are also connected, and after completion of the propulsion the grout hose itself is inserted into the grout hose insertion tube.

According to the third aspect of the double walled pipe according to the present invention, the double walled pipe further comprises: a plurality of rib bands each having at least one elliptic hole extending in a peripheral direction of said inner pipe, each of said rib bands surrounding an outer periphery of said inner pipe, and penetrating in a longitudinal direction of said inner pipe; and a plurality of auxiliary pipe arrangements each inserted into the elliptic hole of the associated rib band in such a manner that it is slidingly movable with respect to said elliptic hole. Said auxiliary pipe arrangements have each a first coupling section and a second coupling section at a front end portion and back end portion, with respect to a pipe jacking direction, of the auxiliary pipe arrangement, respectively, said first coupling section being coupled with a back end portion, with respect to the pipe jacking direction, of a preceding double walled pipe, and said second coupling section being coupled with a front end portion, with respect to the pipe jacking direction, of a subsequent double walled pipe. By the way, it is considered that the auxiliary pipe arrangement-to-arrangement are connected through, for example, a flexible tube having a flexibility. In this case, however, since concrete or the like passes through the flexible tube, the flexible tube bends owing to weight of the concrete. This will invite a poor passage of the concrete. In addition, since it is necessary to connect both the ends of the flexible tube to both the auxiliary pipe arrangements, respectively, there are needed two connection points. Thus, this arrangement involves such a problem that the field work becomes troublesome.

On the contrary, according to the third aspect of the double walled pipe according to the present invention, the auxiliary pipe arrangement-to-arrangement are directly connected. Therefore, a passage of the concrete or the like is kept satisfactory comparing with the connection through the flexible tube and the like. Further, the elliptic hole, to which the auxiliary pipe arrangement is inserted, extends in a peripheral direction of the inner pipe. Hence, even if there occurs during the pipe jacking a relative rotation between the inner pipe of the preceding double walled pipe and the outer pipe thereof, and thus the misalignment exists a little between the auxiliary pipe arrangements, it is possible to reliably position the auxiliary pipe arrangements, thereby readily coupling the auxiliary pipe arrangement-to-arrangement.

Further, according to the fourth aspect of the double walled pipe according to the present invention, a first back filling tube, one end of which is connected to a first check valve of a preceding double walled pipe, and a second back filling tube, one end of which is connected to a second check valve of a subsequent double walled pipe, are connected through a connection tube at least a part of which has a flexibility. Those back filling tubes connected in such a manner is viewed as an overall back filling tube. Hence, even if there occurs a relative rotation between the inner pipe and the outer pipe, this relative rotation may be absorbed by the flexibility of the connection tube, thereby preventing the back filling tube from being damaged. Further, the double walled pipe according to the present invention are provided with a first check valve for preventing earth and sand from flowing into the back filling tube from an exterior of the outer pipe, and in addition a second check valve disposed between the back filling tube and the filling tube. Hence, the second check valve prevents the concrete entering the back filling tube from returning to the inside of the filling tube. Thus, it is possible to avoid such a situation that an interior of the filling tube is stopped up with the concrete. Consequently, it is possible to effectively pass the concrete through the filling tube. In this manner, this filling tube can be used both for back filling to cover the outside of the outer tube with concrete and middle filling to fill the space between the outer pipe and the inner pipe with the concrete.

Here, there are provided a plurality of said first check valves in a longitudinal direction of the outer pipe. The plurality of said first check valves may disposed suitably in accordance with soil conditions of points at which the double walled pipes are buried. This feature makes it possible to enhance a reliability of the back filling.

According to the first aspect of the above-defined jacking method according to the present invention, when the second aspect of the double walled pipe is practiced, in other words, when the double walled pipe-to-pipe, which are each equipped with the intercalary material, are connected, the grout hose-to-hose are coupled, and after the pipe jacking, the filing agent such as cement milk is flowed into the grout hose so that the connected portion of the double walled pipes is filled with the grout hose. This feature makes it possible to implement a complete filling on the connected portion of the double walled pipes, thereby providing the buried pipe with a sufficient toughness.

Here, usually, while the connected grout hoses each other are sequentially drawn, the connected portions are filled with the filling material. In this case, it is acceptable that the grout hoses are drawn either forwards or backwards with respect to the pipe jacking direction. However, in case that the pipe jacking span is long, it is acceptable to provide such an arrangement that the grout hose-to-hose are not connected at the center or its vicinity and the grout hoses are drawn both forwards or backwards with respect to the pipe jacking direction. This arrangement preferably permits a parallel working for the filling.

According to the second aspect of the above-defined jacking method according to the present invention, a back end portion of the double walled pipe finally coupled, which takes such a state that the back end portion of an outer pipe of the double walled pipe finally coupled is exposed in said shaft while said inner pipe is projected by a predetermined length from the back end portion of said outer pipe, is capped with a protection tube of which one end is closed with a cover; a bearing wall is constructed for covering the back end portion of said double walled pipe finally coupled, which takes said state, and said protection tube with which said back end portion is capped, said bearing wall being contact with said side wall; and said inner pipe connection step, said outer pipe moving step and said pipe jacking step are repeatedly executed in connection with a plurality of said subsequent double walled pipes, while causing said bearing wall to bear a reaction force of a pipe jacking, so that the plurality of said subsequent double walled pipes are propelled underground from a side wall which is located over against said side wall. This feature makes it possible to effectively utilize the concrete floor of the shaft through jacking the double pipes from the single shaft, and in addition to save a lot of trouble for carrying jacking apparatuses.

Further, a pipe end structure of a leading pipe for leading a double walled pipe according to the present invention comprising: a dummy pipe which is set up, when pipe jacking, at the rear of an excavation apparatus with respect to an excavation direction, and is withdrawn after pipe jacking; and an adapter tube of which a front end is fixed to the rear of said dummy pipe with respect to the excavation direction, said adapter tube having a rear end to which fixed is an insertion joint for positioning the outer pipe of said double walled pipe with insertion into the front end inside of said double walled pipe, and an inside to which fixed is a stopper for positioning said inner pipe. This structure permits the rear end-to-end to be readily welded. Thus, it is possible to perform the welding in short time. Still further, according to the pipe end structure of a leading pipe of the present invention, the stopper for positioning the main pipe of the double walled pipe is fixed inside of the adapter tube. This arrangement prevents the main pipe from entering inside of the leading pipe.

BRIEF DESCRIPTION OF THE DRAWINGS

FIG. 3 is an enlarged sectional side elevation of a portion circled by a dashed line A shown in FIG. 1;

FIGS. 18(A) and (B) are a sectional side elevation of part of the ring member and a front view of part of the ring member;

FIG. 19 is a partially enlarged view of a ring member as a constituent part of the double walled pipe shown in FIG. 14;

FIG. 21 is a sectional side elevation of a double walled pipe according to the fifth embodiment of the present invention, extending along the longitudinal direction;

DESCRIPTION OF THE PREFERRED EMBODIMENTS

Hereinafter, there will be described embodiments of the present invention.

Figure 1:
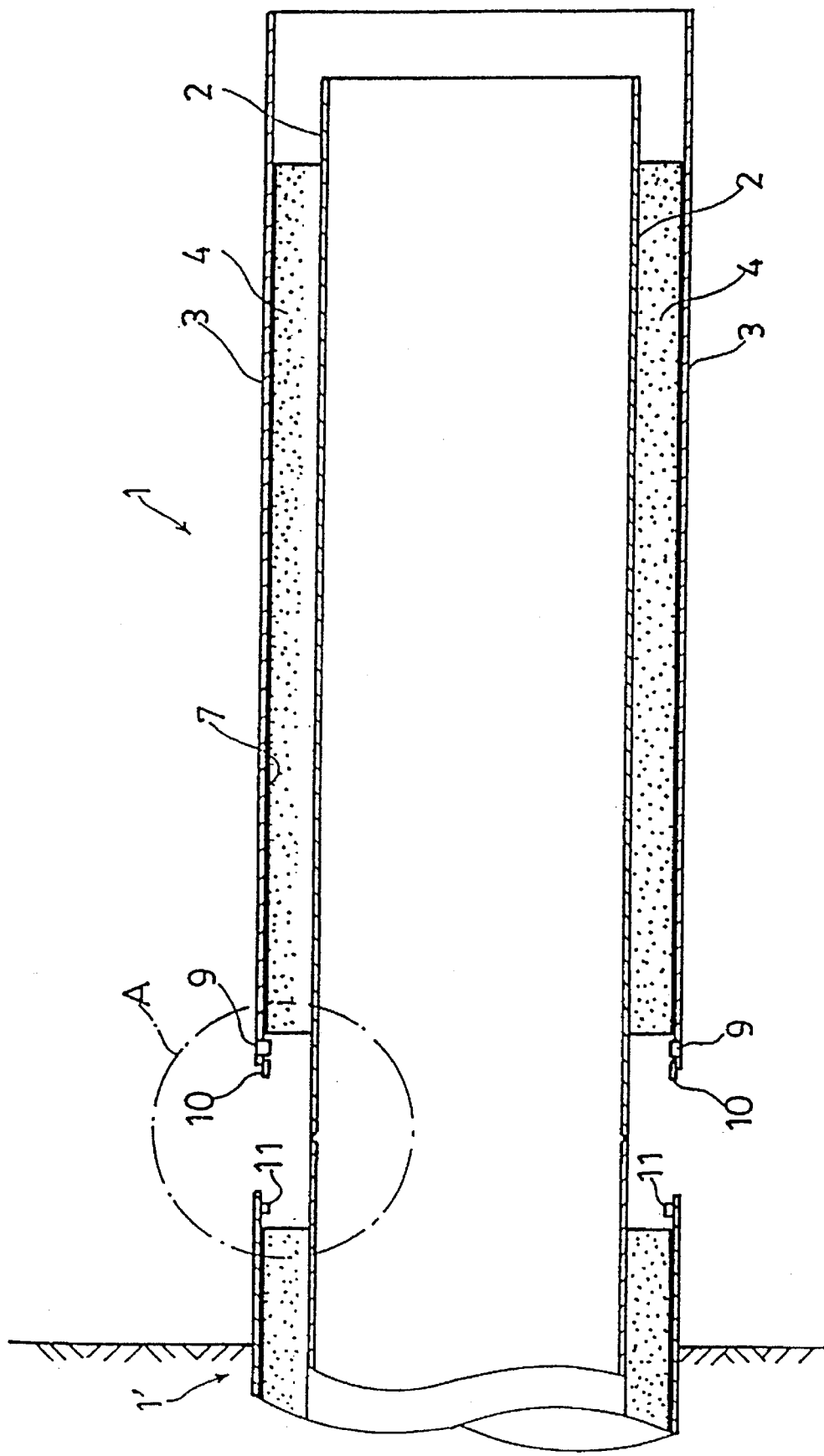
FIG. 1 is a sectional side elevation of a double walled pipe according to an embodiment of the present invention, extending along the longitudinal direction.
Figure 2:
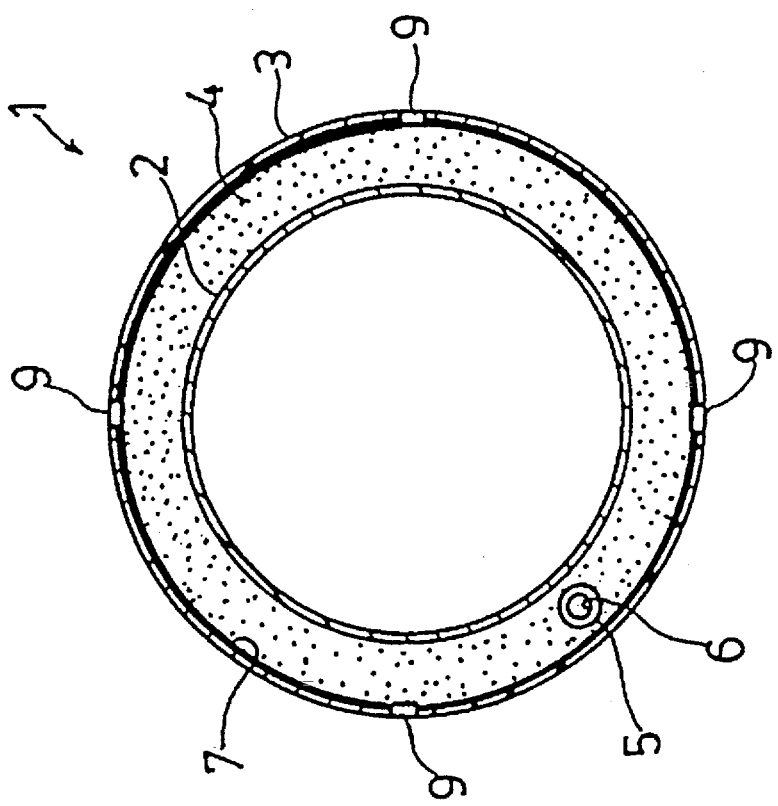
FIG. 2 is a sectional view of the double walled pipe shown in FIG. 1 looking from the right side of FIG. 1.

FIG. 1 is a sectional side elevation of a double walled pipe according to an embodiment of the present invention, extending along the longitudinal direction, FIG. 2 is a sectional view of the double walled pipe shown in FIG. 1 looking from the right side of FIG. 1, and FIG. 3 is an enlarged sectional side elevation of a portion circled by a dashed line A shown in FIG. 1. Here, there will be explained, by way of example, a double walled steel pipe for gas.

FIGS. 1 and 3 show a preceding double walled pipe 1' which has been propelled underground and of which only a part of the rear end is projected into a shaft, and a subsequent double walled pipe 1 which is to be coupled to the rear end of the the preceding double walled pipe 1' and to be propelled underground together with the double walled pipe 1'. These double walled pipes 1 and 1' each have the same structure.

The double walled pipe 1 comprises an inner pipe 2 constructed of a steel pipe having about 900 mm$\phi$, an outer pipe 3 also constructed of a steel pipe having about 1200 mm$\phi$, and concrete 4 as an intercalary member for filling up the space between the inner pipe 2 and the outer pipe 3. The concrete 4 is equipped with, as shown in FIG. 2, a vinyl chloride tube 5 to form a grout hose insertion hole or opening. A grout hose 6 is inserted into the vinyl chloride tube 5.

Further, as seen from FIG. 3, near the front end portion of the outer pipe 3 regarding the pipe jacking direction, there is provided a check valve 9 which serves to open when pushed from the inside of the pipe and to close when pushed from the outside of the pipe. A polypropylene tube 7 is mounted around the concrete 4. A lubricant is coated between an inner wall of the outer pipe 3 and an outer wall of the polypropylene tube 7, so that the outer pipe 3 may slide relative to the concrete 4 when the outer pipe 3 is secured in its longitudinal direction. The front end portion of the outer pipe 3 is provided with a guide ring 10 as a guide member. While the back end portion is provided with a stop ring 11 at its inner wall side. As will be described later in detail, when the outer pipe 3 of the double walled pipe 1 is forwardly slid relative to the concrete 4, the guide ring 10 enters the inside of an outer pipe 3' of the double walled pipe 1' through a back end plane 3c' thereof, so that the top of the guide ring 10 is coupled to the stop ring 11. In addition, a front end plane 3b of the outer pipe 3 of the double walled pipe 1 is coupled to the back end plane 3c' of the outer pipe 3' of the double walled pipe 1'. In this manner, the provision of the guide ring 10 makes it possible to reliably couple the outer pipes 3 and 3' to each other, even if the misalignment exists a little between the outer pipes 3 and 3', since an error is absorbed.

An outside face 2a of the inner pipe 2 is covered with a polyethylene member. As shown in FIGS. 1 and 3, after a front end plane 2b of the inner pipe 2 of the double walled pipe 1 and a back end plane 2c' of the inner pipe 2' of the double walled pipe 1' are coupled to each other, these inner pipes are welded at their coupled portion. After the welding, the portion undergone the welding is covered with a polyethylene tube.

FIGS. 4(A)–4(F) are typical illustrations useful for explanation of a jacking method of burying underground the double walled pipe having the structure shown in FIGS. 1 to 3.

Figure 4A:
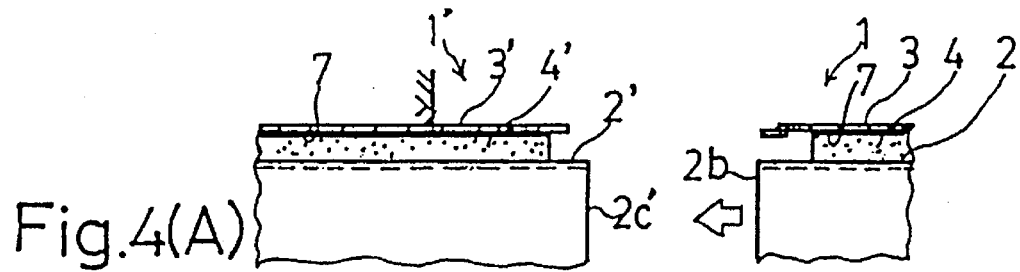
FIGS. 4(A)–4(F) are typical illustrations useful for explanation of a jacking method of burying underground the double walled pipe having the structure shown in FIGS. 1 to 3.

As shown in FIG. 4(A), assume that the preceding double walled pipe 1' has been propelled underground in accordance with a jacking method and a part of the rear end thereof is projected into a shaft. The subsequent double walled pipe 1 is prepared in connection with the preceding double walled pipe 1' of which a part of the rear end is projected into the shaft, and is disposed in such a manner that the front end plane 2b of the inner pipe 2 of the double walled pipe 1 and the back end plane 2c' of the inner pipe 2' of the double walled pipe 1' are coupled to each other (refer to FIGS. 1 and 3).

Figure 4B:
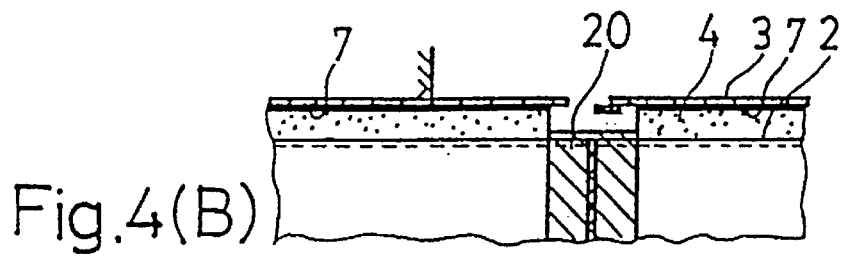

In the next step, as shown in FIG. 4(B), the front end plane 2b of the inner pipe 2 of the double walled pipe 1 and the back end plane 2c' of the inner pipe 2' of the double walled pipe 1', which are coupled to each other, are welded. The state after the welding is inspected using a X ray. When passing inspection, the portion undergone the welding is covered with a polyethylene tube 20. Incidentally, as aforementioned, the outside face 2a of the inner pipe 2, also including portions concealed behind the concrete 4, is covered with the polyethylene member.

Figure 4C:
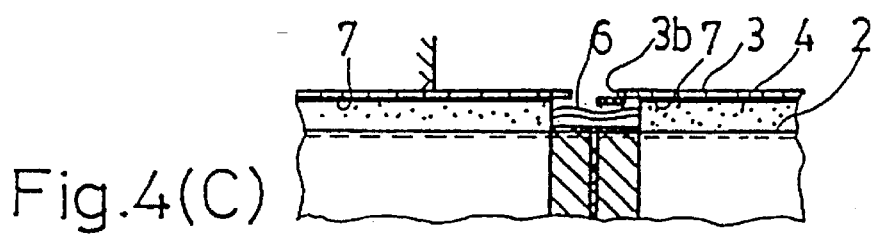

In the next step, as shown in FIG. 4(C), the grout hoses 6 of the double walled pipe 1 and the double walled pipe 1', each being inserted into the vinyl chloride tube 5, as shown in FIG. 2, used for insertion of the grout hose, are connected to each other. Incidentally, with respect to a pair of grout hoses which will be finally located at the middle or its vicinity when a multiple connection of the grout is completed through the pipe jacking, they are left not to be connected so that the connected grout hoses can be separately drawn half-and-half at the front and rear in a pipe jacking direction, respectively.

Figure 4D:
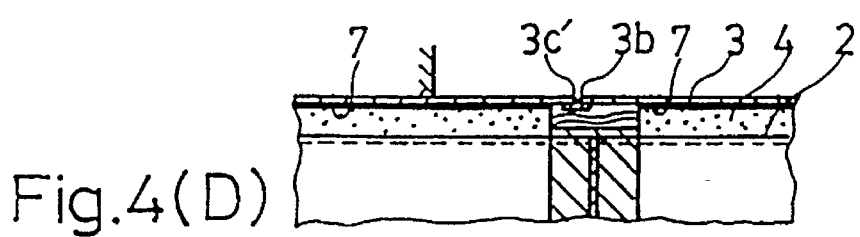

Thereafter, the outer pipe 3 is slid forwardly relative to the concrete 4 until it takes a state shown in FIG. 4(D) from the state shown in FIG. 4(C), so that the front end plane 3b of the outer pipe 3 is coupled to the back end plane 3c' of the outer pipe 3'.

Figure 4E:
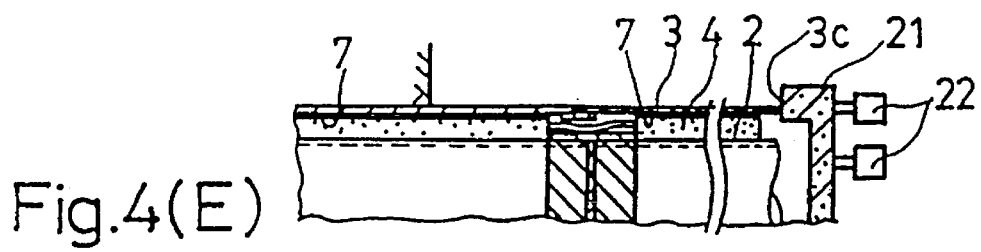

In the next step, as shown in FIG. 4(E), a push wheel 21 is fitted to the rear end of the double walled pipe 1 so as to couple with only the rear end plane 3c of the outer pipe 3, a propulsion oil jack 22 is set to push the push wheel 21, and the double walled pipe 1 is propelled underground, upon acting on the outer pipe 3 with the thrust, together with the double walled pipe 1' and the further preceding double walled pipes. The front end portion of the first stage of double walled pipe is mounted with an excavation head (not illustrated), thereby jacking while digging.

Figure 4F:
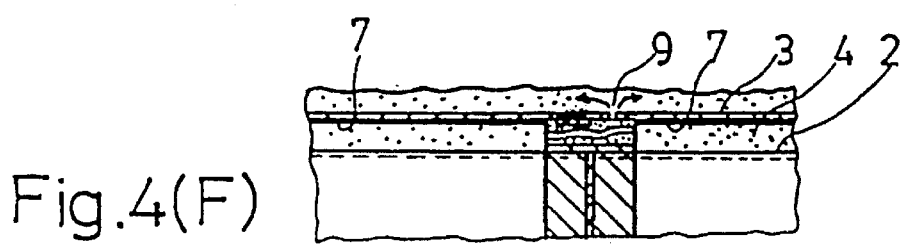

After a series of processes as mentioned above is repeatedly applied for a number of double walled pipes, the cement milk is flowed into the grout hose 6 (refer to FIG. 2) so as to fill the space between the inner pipe 2 and the outer pipe 3 at each of the connected portions of the double walled pipes, while the grout hose is drawn in such a manner that the top of the grout hose is sequentially disposed at the connected portions of the double walled pipes. In this case, when the grout hose 6 is drawn backwards in the pipe jacking direction, in order to prevent the cement milk from overflowing through the opening of the edge of the grout hose insertion tube 5 of the preceding double walled pipes, it is preferable to close the opening. Further, it is preferable, when the grout hose 6 is drawn, to draw the grout hose 6 while the cement milk is flowed into the grout hose 6, so that the inside of the grout hose insertion tube 5 is also filled with the cement milk. When the space between the inner pipe 2 and the outer pipe 3 at the connected portion is filled with the cement milk, water, earth and sand, etc., which enter between the inner pipe 2 and the outer pipe 3, are exhausted by the cement milk out of the outer pipe 3 via the check valve 9, and in addition the cement milk itself also flows out via the check valve 9, whereby the outer wall of the outer pipe 3 is also covered with the cement milk, as shown in FIG. 4(F). Thus, it is possible to provide the underground pipe with greater toughness, and in addition to prevent a settlement of the ground level.

The above-mentioned double pipe, which is buried underground, is adapted to flow gas, by way of example, with a gas pressure 70 kg/cm$^2$, through the inside of the inner thereof.

Figure 5:
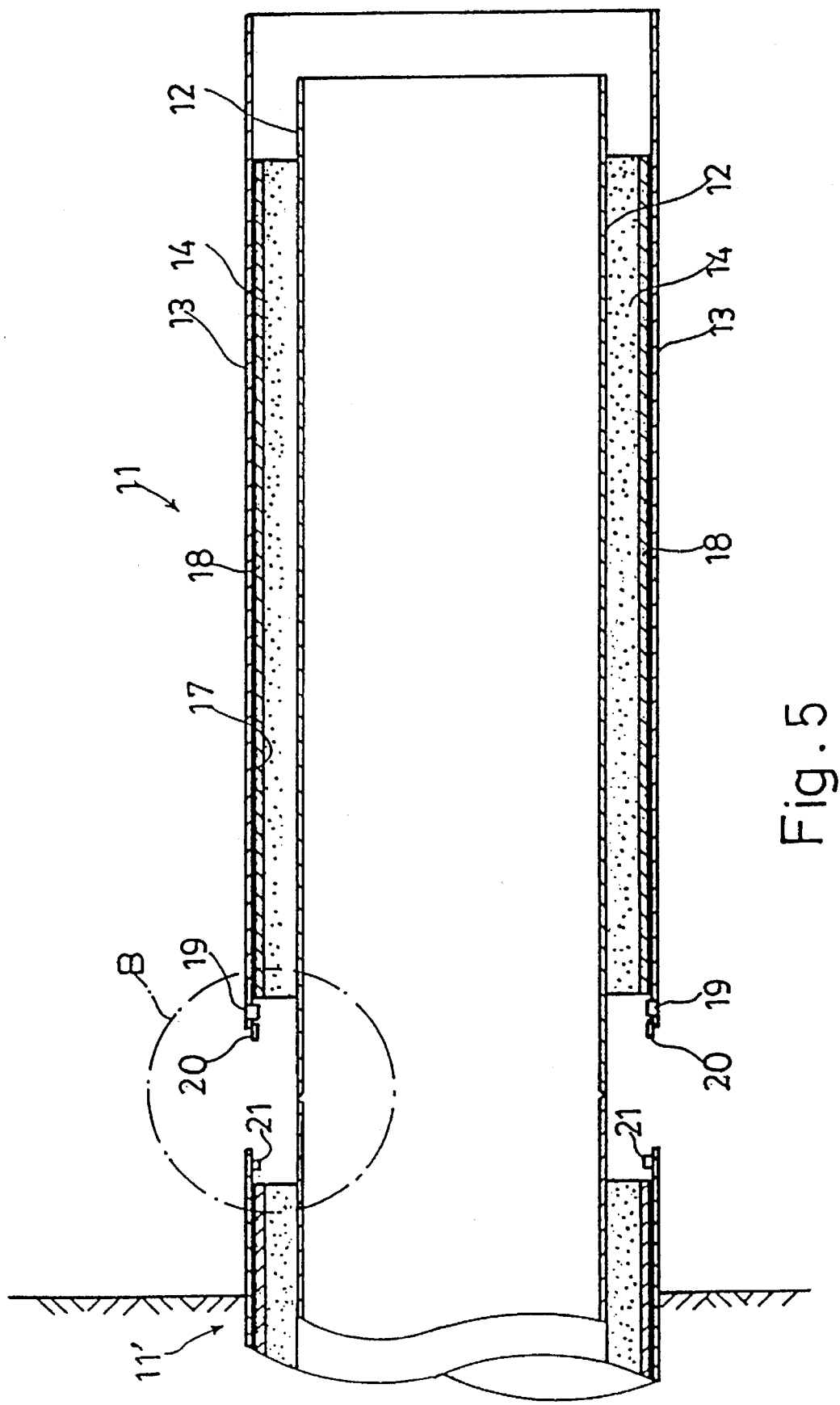
FIG. 5 is a sectional side elevation of a double walled pipe according to the second embodiment of the present invention, extending along the longitudinal direction.
Figure 6:
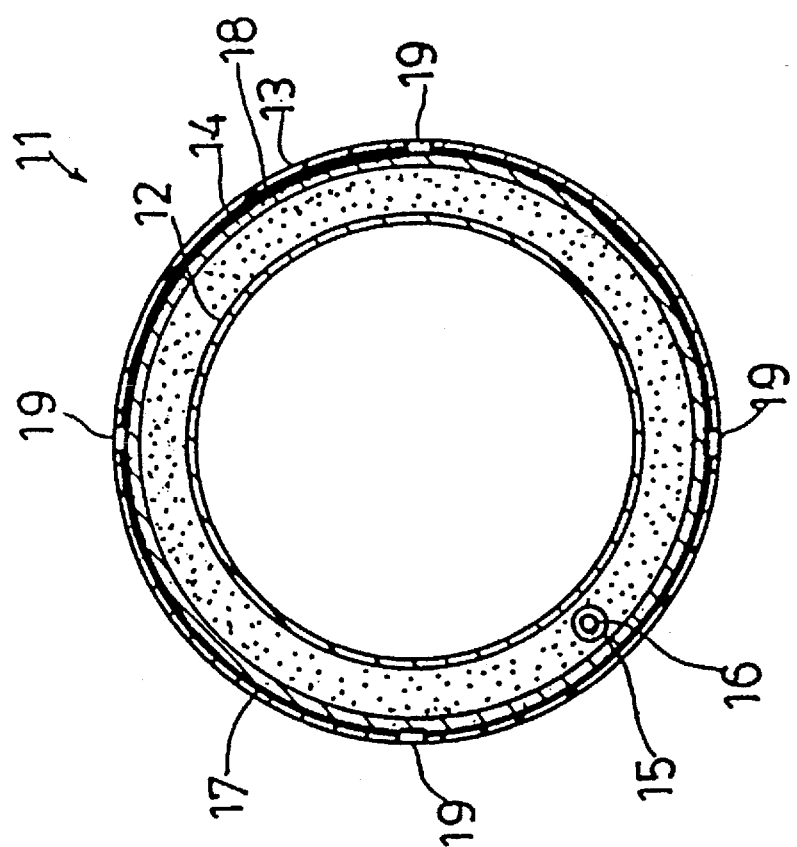
FIG. 6 is a sectional view of the double walled pipe shown in FIG. 5 looking from the right side of FIG. 1.
Figure 7:
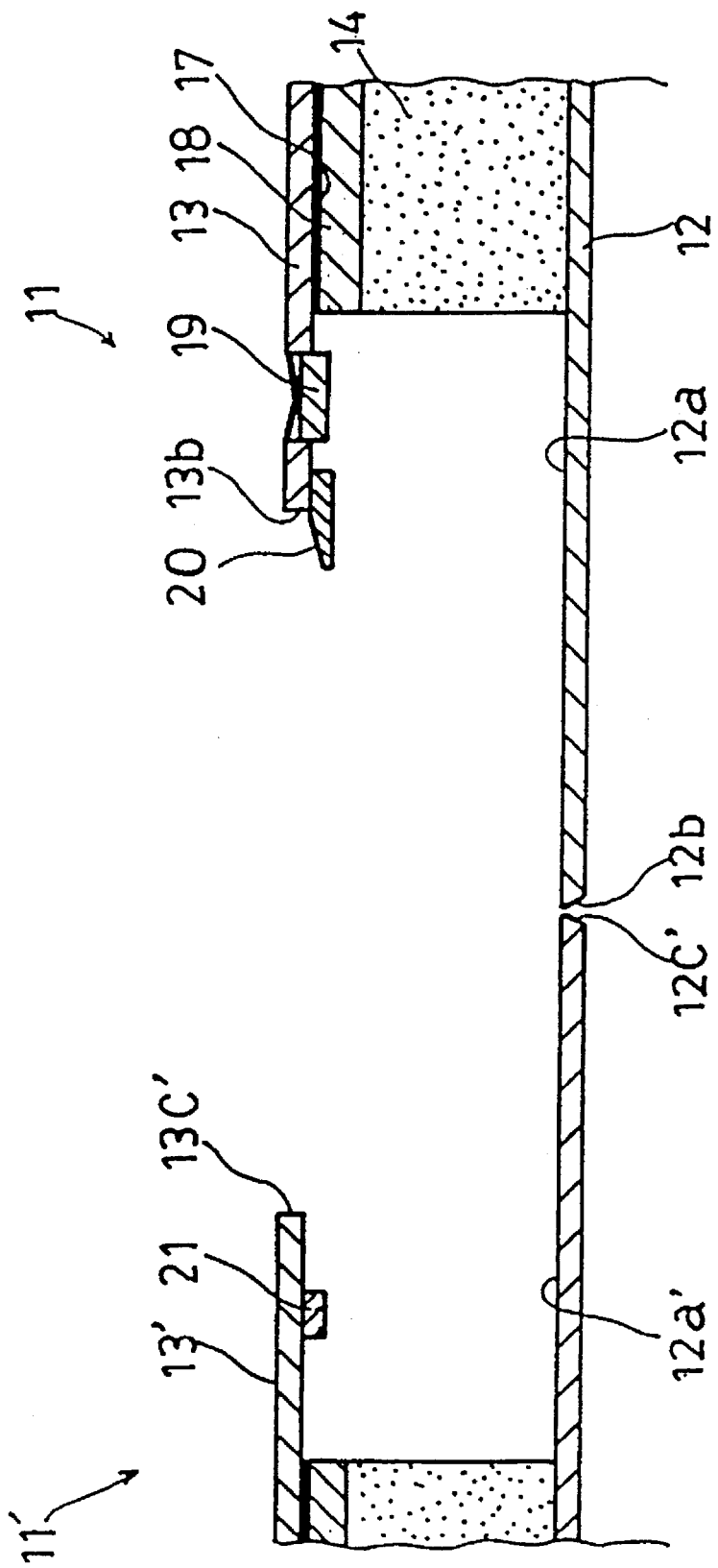
FIG. 7 is an enlarged sectional side elevation of a portion circled by a dashed line B shown in FIG. 5.

FIG. 5 is a sectional side elevation of a double walled pipe according to the second embodiment of the present invention, extending along the longitudinal direction. FIG. 6 is a sectional view of the double walled pipe shown in FIG. 5 looking from the right side of FIG. 5. FIG. 7 is an enlarged sectional side elevation of a portion circled by a dashed line B shown in FIG. 5. Here also, there will be explained, by way of example, a double walled steel pipe for gas.

FIGS. 5 and 7 show a preceding double walled pipe 11' which has been propelled underground and of which only a part of the rear end is projected into a shaft, and a subsequent double walled pipe 11 which is to be coupled to the rear end of the preceding double walled pipe 11' and to be propelled underground together with the double walled pipe 11'. These double walled pipes 11 and 11' each have the same structure.

The double walled pipe 11 comprises an inner pipe 12 constructed of a steel pipe having about 900 mmφ, an outer pipe 13 also constructed of a steel pipe having about 1200 mmφ, concrete 14 as an intercalary member for filling up the space between the inner pipe 12 and the outer pipe 13, and a styrene foam layer 18 using styrene foam as a cushion material. The concrete 14 is equipped with, as shown in FIG. 6, a vinyl chloride tube 15 to form a grout hose insertion hole or opening. A grout hose 16 is inserted into the vinyl chloride tube 15.

Further, as seen from FIG. 7, near the front end portion of the outer pipe 13 regarding the pipe jacking direction, there is provided a check valve 19 which serves to open when pushed from the inside of the pipe and to close when pushed from the outside of the pipe. A polypropylene tube 17 is mounted between an inner wall of the outer pipe 13 and the styrene foam layer 18. A lubricant is coated between an inner wall of the outer pipe 13 and an outer wall of the polypropylene tube 17. This double walled pipes 11 is provided with a plurality of sliding portions, as a portion which permits the outer pipe 13 to slide when it is pushed in its longitudinal direction, such as a first portion between the outer pipe 13 and the polypropylene tube 17, a second portion between the polypropylene tube 17 and the styrene foam layer 18, and a third portion between the styrene foam layer 18 and the concrete 14. The provision of such a plurality of sliding portions makes it possible to expect a more reliable sliding relative to the concrete 14 and the inner pipe 12, comparing with for example a case where there is arranged in such a way that a sliding of the outer pipe is permitted only between the outer pipe 13 and the polypropylene tube 17, having no styrene foam layer 18. While it is acceptable that the sliding occurs on any of the plurality of sliding portions as mentioned above, FIGS. 8 and 9 show the structure, assuming that the sliding occurs between the outer pipe 13 and the polypropylene tube 17. The front end portion of the outer pipe 13 is provided with a guide ring 20 as a guide member. While the back end portion is provided with a stop ring 21 at its inner wall side. As will be described later in detail, when the outer pipe 13 of the double walled pipe 11 is forwardly slid relative to the concrete 14, the guide ring 20 enters the inside of an outer pipe 13' of the double walled pipe 11' through a back end plane 13c' thereof, so that the top of the guide ring 20 is coupled to the stop ring 21. In addition, a front end plane 13b of the outer pipe 13 of the double pipe 11 is coupled to the back end plane 13c' of the outer pipe 13' of the double walled pipe 11'. If the misalignment or an error in size exists between the outer pipes 13 and 13', a positioning has to be conducted in a manner as will be described later. According to the present embodiment, in such a situation, it is possible to facilitate the positioning work, since there is provided the styrene foam layer 18.

An outside face 12a of the inner pipe 12 is covered with a polyethylene member. As shown in FIGS. 5 and 7, after a front end plane 12b of the inner pipe 12 of the double walled pipe 11 and a back end plane 12c' of the inner pipe 12' of the double walled pipe 11' are coupled to each other, these inner pipes are welded at their coupled portion. After the welding, the portion undergone the welding is covered with a anticorrosion polyethylene tube.

FIGS. 8(A)–8(F) are typical illustrations useful for explanation of a jacking method of burying underground the double walled pipe having the structure shown in FIGS. 5 to 7.

Figure 8A:
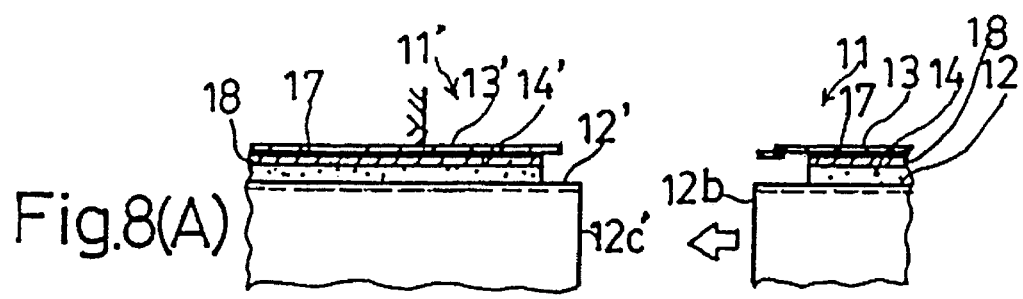
FIGS. 8(A)–8(F) are typical illustrations useful for explanation of a jacking method of burying underground the double walled pipe having the structure shown in FIGS. 5 to 7.

As shown in FIG. 8(A), assume that the preceding double walled pipe 11' has been propelled underground in accordance with a jacking method and a part of the rear end thereof is projected into a shaft. The subsequent double walled pipe 11 is prepared in connection with the preceding double walled pipe 11' of which a part of the rear end is projected into the shaft, and is disposed in such a manner that the front end plane 12b of the inner pipe 12 of the double walled pipe 11 and the back end plane 12c' of the inner pipe 12' of the double walled pipe 11' are coupled to each other (refer to FIGS. 5 and 7).

Figure 8B:
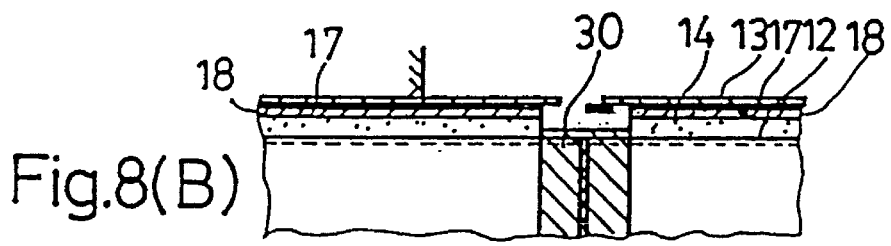

In the next step, as shown in FIG. 8(B), the front end plane 12b of the inner pipe 12 of the double walled pipe 11 and the back end plane 12c' of the inner pipe 12' of the double walled pipe 11', which are coupled to each other, are welded. The state after the welding is inspected by a X ray. When passing inspection, the portion undergone the welding is covered with a polyethylene tube 30. Incidentally, as aforementioned, the outside face 12a of the inner pipe 12, also including portions concealed behind the concrete 14, is covered with the polyethylene member.

Figure 8C:
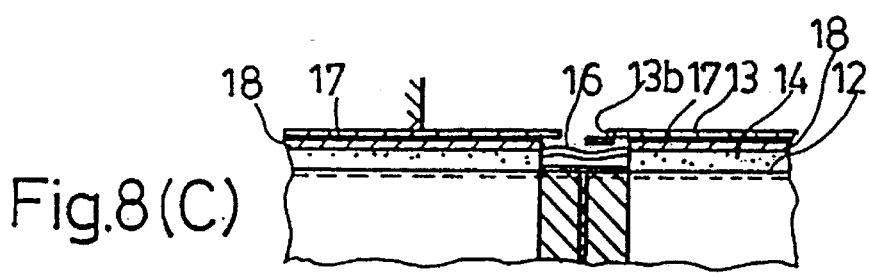
Figure 8D:
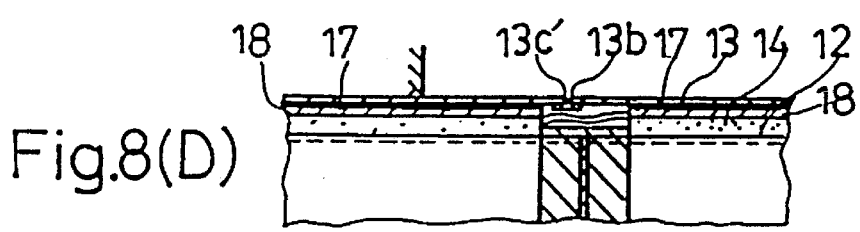

In the next step, as shown in FIG. 8(C), the grout hoses 16 of the double walled pipe 11 and the double walled pipe 11', each being inserted into the vinyl chloride tube 15, as shown in FIG. 6, used for insertion of the grout hose, are connected to each other. Incidentally, with respect to a pair of grout hoses which will be finally located at the middle or its vicinity when a multiple connection of the grout is completed through the pipe jacking, they are left not to be connected so that the connected grout hoses can be separately drawn half-and-half at the front and rear in a pipe jacking direction, respectively.

Thereafter, the outer pipe 13 is slid forwardly relative to the concrete 14 until it takes a state shown in FIG. 8 (D) from the state shown in FIG. 8 (C), so that the front end plane 13b of the outer pipe 13 is coupled to the back end plane 13c' of the outer pipe 13'.

Now, there will be explained such a case that a misalignment or the like exists between the outer pipes 13 and 13', and thus the outer pipe 13 can not be coupled properly with the outer pipe 13' through simply sliding forwardly the outer pipe 13.

Figure 9:
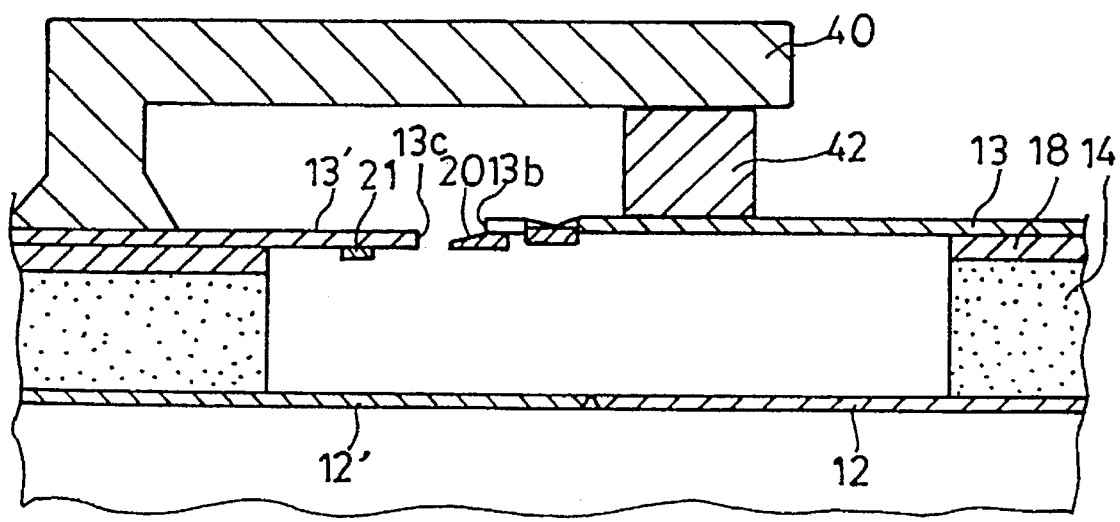
FIG. 9 is a view showing a state of a misalignment between the outer pipes.

FIG. 9 is a view showing a state of a misalignment between the outer pipes 13 and 13'.

In FIG. 9, the outer pipe 13 deviates upwards with respect to the outer pipe 13'. Hence, if the outer pipe 13 is simply slid forwardly (left hand in the figure), the guide ring 20 will be coupled with the back end plane 13c' of the outer pipe 13'. Thus, in a case where such a misalignment exists, a L-like shaped member 40, as shown in the figure, which has a sufficiently greater toughness and rigidity in comparison with the outer pipe 13, is temporarily welded on the outer pipe 13', and a wedge 42 is urged between the member 40 and the outer pipe 13 slid in the front. As a result, the front edge portion of the outer pipe 13 is bent downwards, so that the guide ring 20 may enter the inside of the outer pipe 13' when the outer pipe 13 is further slid forwardly. In connection with a positioning of the outer pipe 13, the provision of the styrene foam layer 18 serves to more facilitate the positioning of the outer pipe 13, in comparison with a case where the concrete 14 is filled up to the portion of the styrene foam layer 18, since the styrene foam layer 18 may be deformed. Thus, the positioning working efficiency is remarkably enhanced.

Figure 8E:
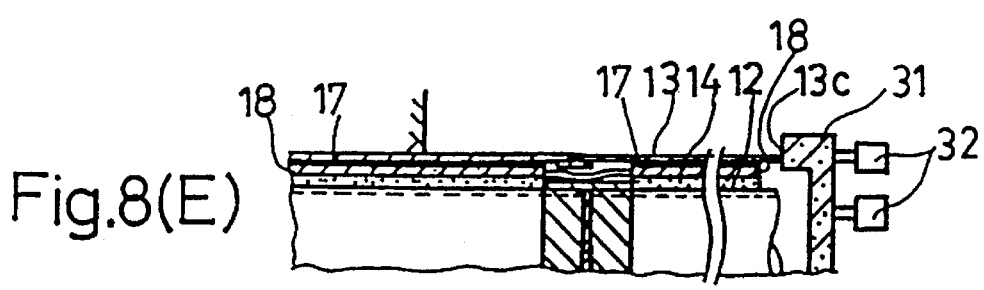

In this manner, after the outer pipes 13 and 13' are properly coupled to each other, in the next step, as shown in FIG. 8(E), a push wheel 31 is fitted to the rear end of the double walled pipe 11 so as to couple with only the rear end plane 13c of the outer pipe 13, a propulsion oil jack 32 is set to push the push wheel 31, and the double walled pipe 11 is propelled underground, upon acting on the outer pipe 13 with the thrust, together with the double walled pipe 11' and the further preceding double walled pipes. The front end portion of the first stage of double walled pipe is mounted with an excavation head (not illustrated), thereby jacking while digging.

Incidentally, while it has been described above that after the outer pipe 13 is slid forwardly, the propulsion oil jack 32 is set to push the push wheel 31, it is acceptable that this setting is conducted prior to sliding of the outer pipe 13, and the outer pipe 13 is slid by the propulsion oil jack 32.

Figure 8F:
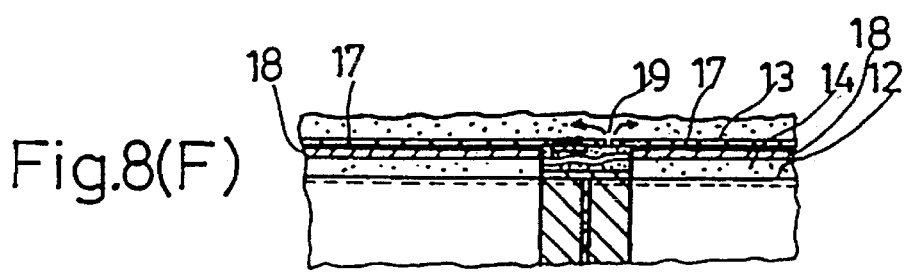

After a series of processes as mentioned above is repeatedly applied for a number of double walled pipes, the cement milk is flowed into the grout hose 16 (refer to FIG. 6) so as to fill the space between the inner pipe 12 and the outer pipe 13 at each of the connected portions of the double walled pipes, while the grout hose is drawn in such a manner that the top of the grout hose 16 is sequentially disposed at the connected portions of the double walled pipes. In this case, when the grout hose 16 is drawn backwards in the pipe jacking direction, in order to prevent the cement milk from overflowing through the opening of the edge of the grout hose insertion tube 15 of the preceding double walled pipes, it is preferable to close the opening. Further, it is preferable, when the grout hose 16 is drawn, to draw the grout hose 16 while the cement milk is flowed into the grout hose 16, so that the inside of the grout hose insertion tube 15 is also filled with the cement milk. When the space between the inner pipe 12 and the outer pipe 13 at the connected portion is filled with the cement milk, water, earth and sand, etc., which creep between the inner pipe 12 and the outer pipe 13, are exhausted by the cement milk out of the outer pipe 13 via the check valve 19, and in addition the cement milk itself also flows out via the check valve 19, whereby the outside face of the outer pipe 13 is also covered with the cement milk, as shown in FIG. 8(F). Thus, it is possible to provide the underground pipe with greater toughness, and in addition to prevent a settlement of the ground level.

Figure 10:
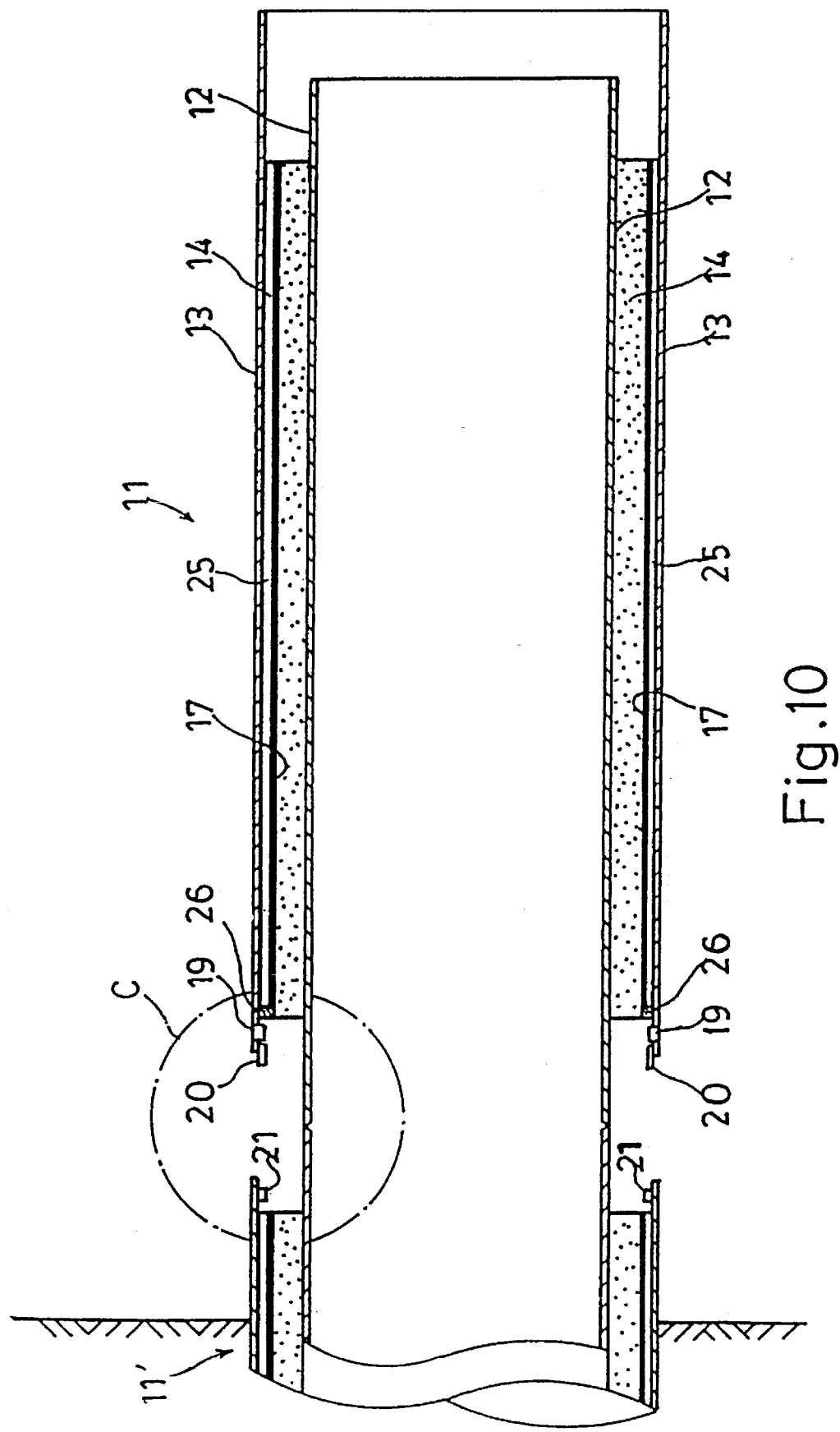
FIG. 10 is a sectional side elevation of a double walled pipe according to the third embodiment of the present invention, extending along the longitudinal direction.

FIG. 10 is a sectional side elevation of a double walled pipe according to the third embodiment of the present invention, extending along the longitudinal direction.

Figure 11:
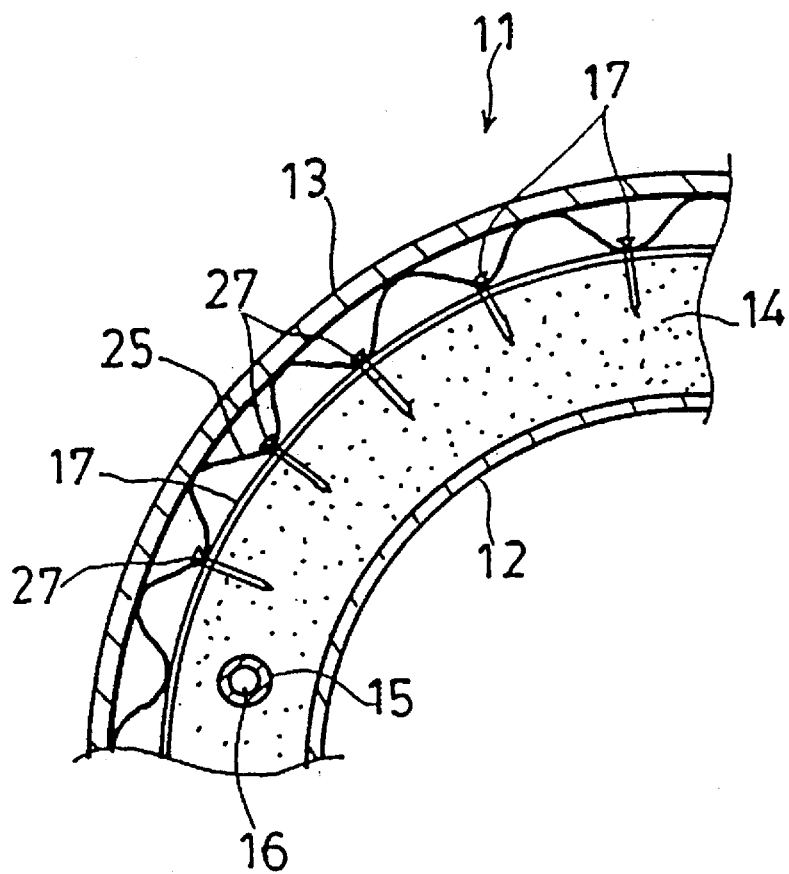
FIG. 11 is a sectional view of the double walled pipe shown in FIG. 10 looking from the right side of FIG. 10.
Figure 12:
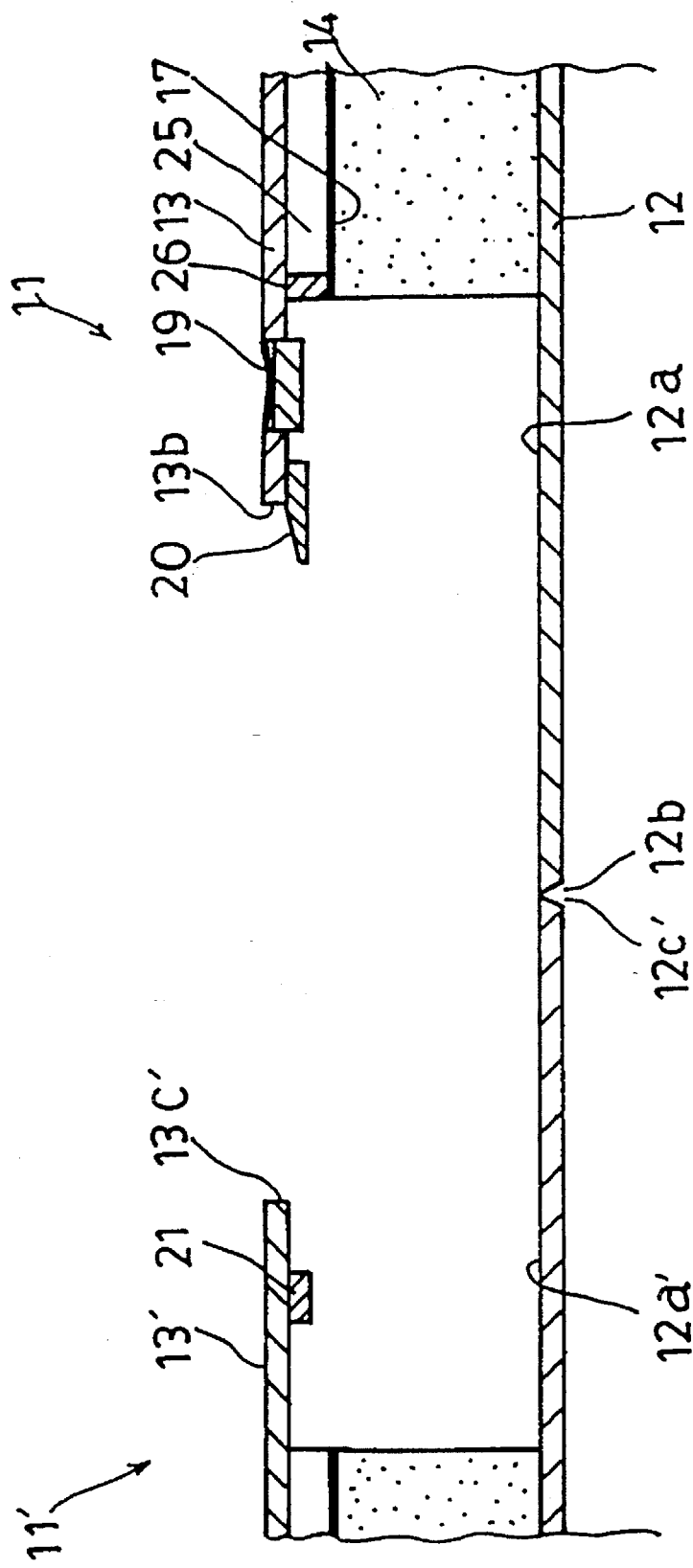
FIG. 12 is an enlarged sectional side elevation of a portion circled by a dashed line C shown in FIG. 10.

FIG. 11 is a sectional view of the double walled pipe shown in FIG. 10 looking from the right side of FIG. 10. FIG. 12 is an enlarged sectional side elevation of a portion circled by a dashed line C shown in FIG. 10. Here also, there will be explained, by way of example, a double walled steel pipe for gas. In these figures, the same parts are denoted by the same reference numbers as those of the figures involved in the second embodiment described above, and the redundant description will be omitted.

The double walled pipe 11 in FIG. 10 comprises concrete 14 as an intermediate member for filling up the space between the inner pipe 12 and the outer pipe 13, a polypropylene tube 17 as a barrier material for covering an outer wall of the concrete 14, and a hard vinyl chloride corrugated sheet 25, as a cushion material, contacting with an outside face of the polypropylene tube 17 and an inner wall of the outer pipe 13. If the concrete 14 adheres to the hard vinyl chloride corrugated sheet 25 and be hardened thereon, then it will be a cause of prohibiting the hard vinyl chloride corrugated sheet 25 from being deformed. Thus, it will be difficult for the hard vinyl chloride corrugated sheet 25 to serve as the cushion material. In order to avoid such a drawback, there is provided the polypropylene tube 17 between the hard vinyl chloride corrugated sheet 25 and the concrete 14. As shown in FIG. 11, the hard vinyl chloride corrugated sheet 25 is fixed with vises 27 on the polypropylene tube 17 and the concrete 14. As a result, when the outer pipe 13 is slid relative to the concrete 14, the sliding occurs between the outer pipe 13 and the hard vinyl chloride corrugated sheet 25. The vis 27 serves also to reinforce the concrete 14.

As shown in FIG. 12, near the front end portion of the outer pipe 13 regarding the pipe jacking direction, there is provided a check valve 19. The front end portion of the outer pipe 13 is equipped with a guide ring 20 as a guide member. While the back end portion is equipped with a stop ring 21 at its inner wall side. The front end plane and rear end plane of the corrugated sheet 25 each are capped with a blowing polystyrene member 26 as a cap for cut-off water.

FIGS. 13(A)–13(E) are typical illustrations useful for explanation of a jacking method of burying underground the double walled pipe having the structure shown in FIGS. 10 to 12.

Figure 13A:
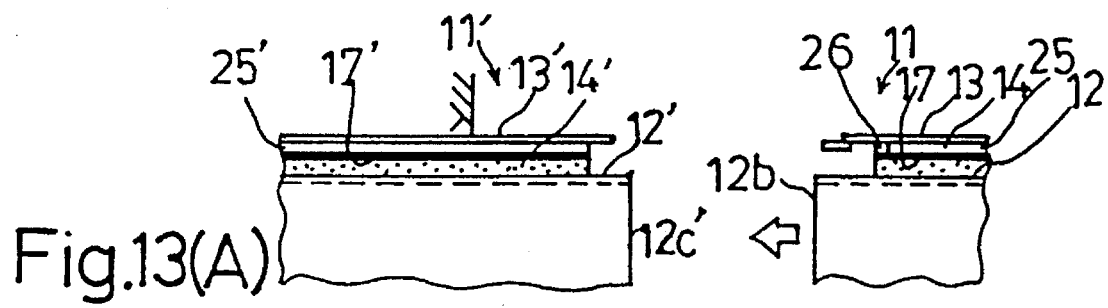
FIGS. 13(A)–13(E) are typical illustrations useful for explanation of a jacking method of burying underground the double walled pipe having the structure shown in FIGS. 10 to 12.
Figure 13B:
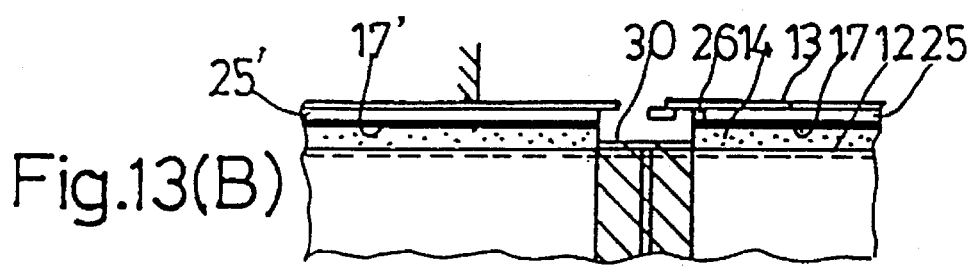

FIGS. 13(A) and 13(B) show the similar processes as shown in FIGS. 8(A) and 8(B), respectively, and thus the explanation will be omitted.

Figure 13C:
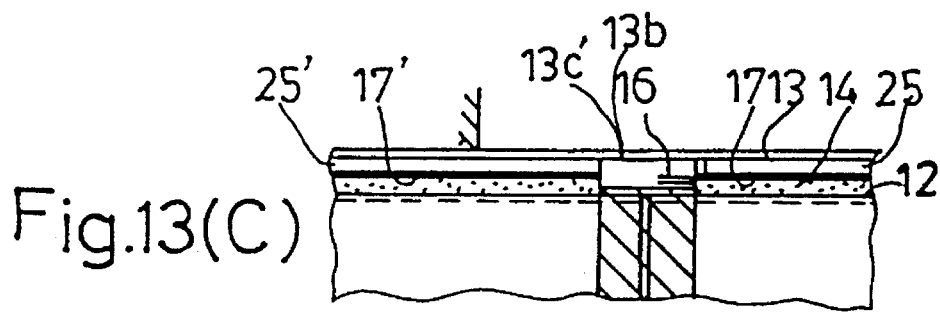
Figure 13D:
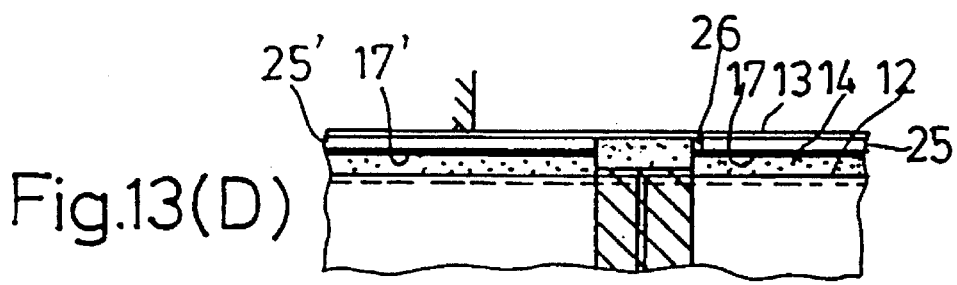

As shown in FIG. 13(C), the grout hose 16, which is inserted into the vinyl chloride tube 15 shown in FIG. 11, is drawn so that the front end of the grout hose is located between the inner pipe 12 and the outer pipe 13, and the outer pipe 13 is slid forwardly relative to the concrete 14. In this manner, the front end plane 13b of the outer pipe 13 is coupled to the back end plane 13c' of the outer pipe 13'. At that time, if a misalignment exists between the outer pipes 13 and 13', a positioning is conducted in the manner as aforementioned.

In the next step, as shown in FIG. 13 (D), after the outer pipes 13 and 13' are properly coupled to each other, the cement milk is filled to the connected portion of the double walled pipe 11 and 11'.

Since the front end plane of the hard vinyl chloride corrugated sheet 25' of the propulsion double pipe 11' is capped with a blowing polystyrene member 26 (not illustrated) for cut-off of water, it may be avoided, when the cement milk is filled to the connected portion of the double walled pipe 11 and 11', that the cement milk intrudes into the gap between the hard vinyl chloride corrugated sheet 25 and the outer pipe 13, and the gap between the hard vinyl chloride corrugated sheet 25 and the polypropylene tube 17. Hence, it does not happen that the hard vinyl chloride corrugated sheet 25 is fixed by the cement milk. Consequently, the flexibility of the hard vinyl chloride corrugated sheet 25 is ensured. Thus, in a case where a misalignment or the like between the outer pipes 13 and 13' exists, the positioning is facilitated and its working efficiency is remarkably enhanced.

Figure 13E:
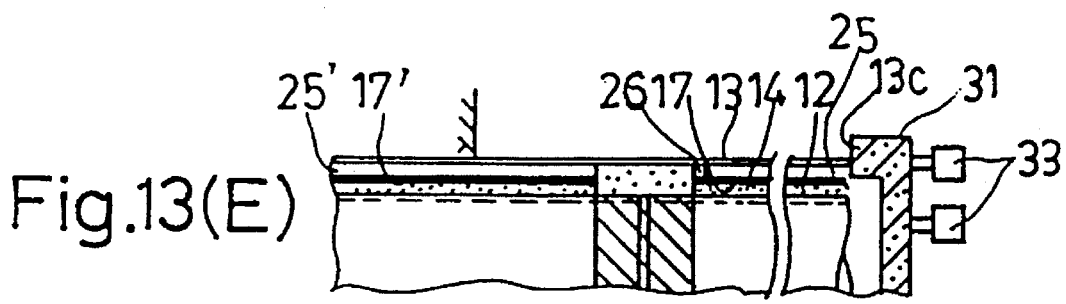

In the next step, as shown in FIG. 13(E), a push wheel 31 is fitted to the rear end of the double walled pipe 11 so as to couple with only the rear end plane 13c of the outer pipe 13, a propulsion oil jack 33 is set to push the push wheel 31, and the double walled pipe 11 is propelled underground, upon acting on the outer pipe 13 with the thrust, together with the double walled pipe 11' and the further preceding double walled pipes.

In order to avoid such a situation that the cement milk intrudes into the gap between the hard vinyl chloride corrugated sheet 25' and the outer pipe 13', and the gap between the hard vinyl chloride corrugated sheet 25' and the polypropylene tube 17', so that an amount of cement milk to be filled to the connected portion is increased, it is preferable to cap with the styrene foam not only the front end plane of the hard vinyl chloride corrugated sheet, but also the back end plane thereof.

While FIGS. 13(A)–13(E) show a jacking method in which a jacking is carried out after cement milk is flowed into the connected portion of two double walled pipes 11 and 11', it is acceptable, also in this example provided with the corrugated sheet, to adopt the jacking method shown in FIGS. 8(A)–8(F) in which after a multiple double walled pipes are propelled, the connected portions are subjected to the grout disposal. In this case, from the view point that a flexibility of the corrugated sheet is maintained, there is no need to mount a cap for cut-off of water.

Figure 14:
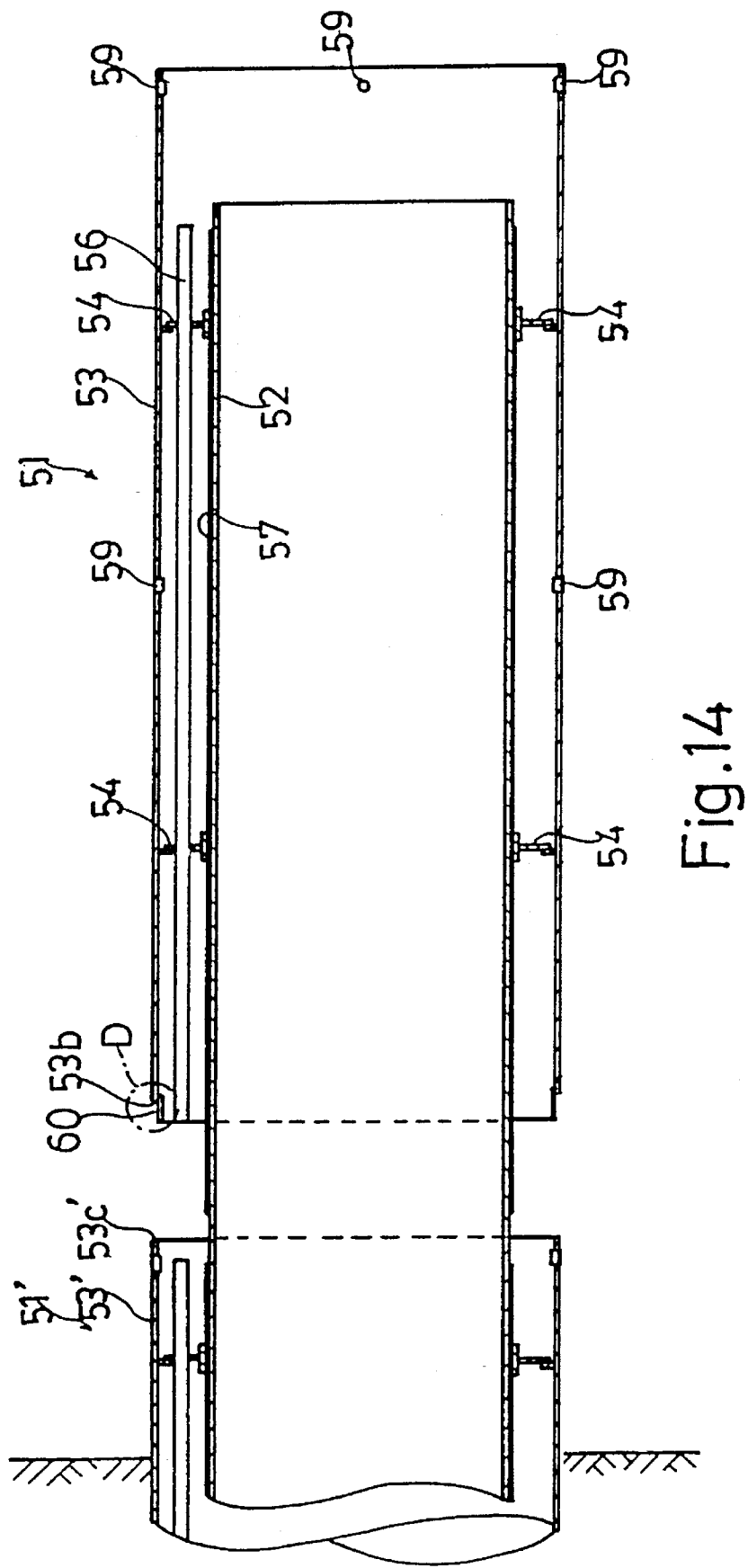
FIG. 14 is a sectional side elevation of a double walled pipe according to the fourth embodiment of the present invention, extending along the longitudinal direction.
Figure 15:
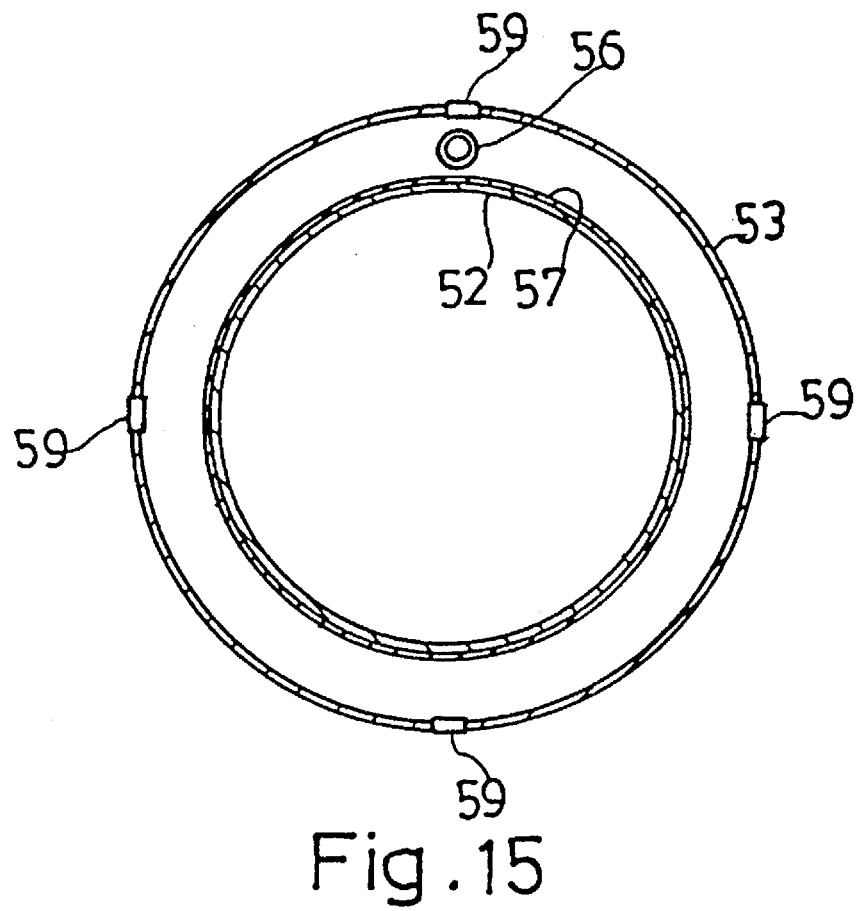
FIG. 15 is a sectional view of the double walled pipe shown in FIG. 14 looking from the right side of FIG. 14.
Figure 16:
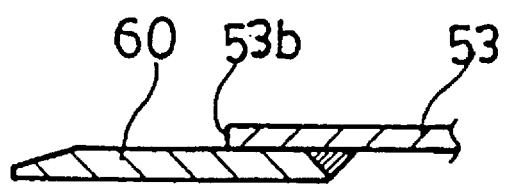
FIG. 16 is an enlarged sectional side elevation of a portion circled by a dashed line D shown in FIG. 14.

FIG. 14 is a sectional side elevation of a double walled pipe according to the fourth embodiment of the present invention, extending along the longitudinal direction. FIG. 15 is a sectional view of the double walled pipe shown in FIG. 14 looking from the right side of FIG. 14. FIG. 16 is an enlarged sectional side elevation of a portion circled by a dashed line D shown in FIG. 14. Here also, there will be explained, by way of example, a double walled steel pipe for gas.

FIG. 14 shows a preceding double walled pipe 51' which has been propelled underground and of which only a part of the rear end is projected into a shaft, and a subsequent double walled pipe 51 which is to be coupled to the rear end of the preceding double walled pipe 51' and to be propelled underground together with the double walled pipe 51'. These double walled pipes 51 and 51' each have the same structure.

The double walled pipe 51 comprises an inner pipe 52 constructed of a steel pipe having about 900 mm$\phi$, an outer pipe 53 also constructed of a steel pipe having about 1200 mm$\phi$, and two ring members 54 which are disposed at two portions between the inner pipe 52 and the outer pipe 53. Each of the ring member 54 is provided with a grout hose insertion opening 54c (refer to FIG. 17). A grout hose 56 is inserted into the grout hose insertion opening 54c.

Further, at the upper and lower and the right and left near the middle or its vicinity of the outer pipe 53, and at the upper and lower and the right and left near the rear end portion or its vicinity of the outer pipe 53 regarding the jacking direction, there are provided check valves 59, respectively, each serving to open when pushed from the inside of the pipe and to close when pushed from the outside of the pipe. The front end portion of the outer pipe 53 is provided with a guide ring 60 as a guide member, as seen from FIG. 16. As will be described later in detail, when the outer pipe 53 of the double walled pipe 51 is forwardly slid on the ring member 54, the guide ring 60 enters the inside of an outer pipe 53' of the double walled pipe 51' through a back end plane 53c' thereof. In addition, a front end plane 53b of the outer pipe 53 of the double walled pipe 51 is coupled to the back end plane 53c' of the outer pipe 53' of the double walled pipe 51'. In this manner, the provision of the guide ring 60 makes it possible to reliably couple the outer pipes 53 and 53' to each other, even if the misalignment exists a little between the outer pipes 53 and 53', since an error is absorbed.

An outside face of the inner pipe 52 is covered with a polyethylene member 57. As shown in FIG. 14, after a front end plane of the inner pipe 52 of the double walled pipe 51 and a back end plane of the inner pipe 52' of the double walled pipe 51' are coupled to each other, these inner pipes are welded at their coupled portion. After the welding, the portion undergone the welding is covered with a anticorrosion polyethylene tube.

Figure 17:
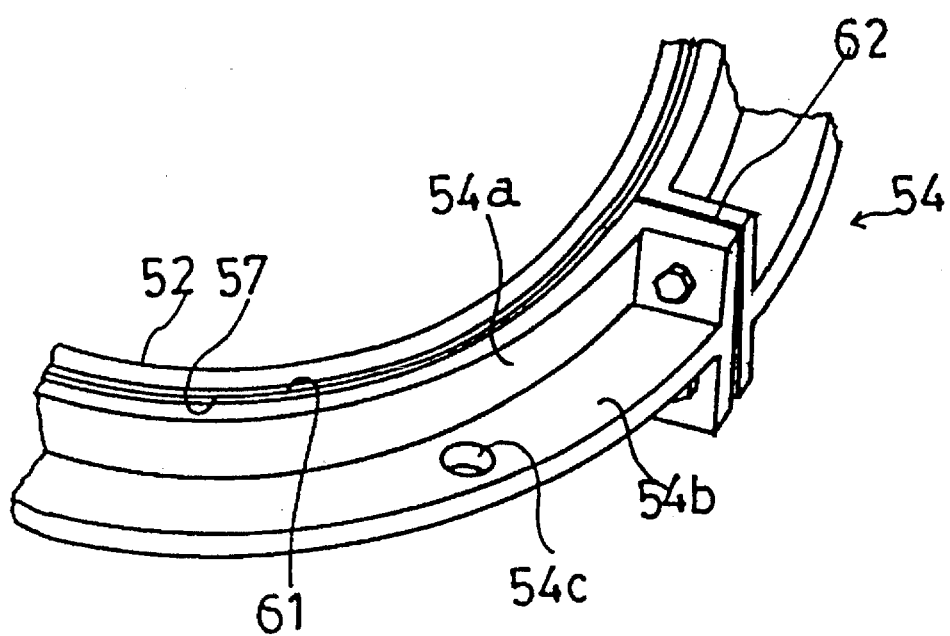
FIG. 17 is a perspective view of part of a ring member.

FIG. 17 is a perspective view of part of a ring member. FIGS. 18(A) and (B) are a sectional side elevation of part of the ring member and a front view of part of the ring member. FIG. 19 is a partially enlarged view of a ring member as a constituent part of the double walled pipe shown in FIG. 14. It is noted that FIG. 17 and FIGS. 18(A) and (B) omit a rubber disc 63 shown in FIG. 19 for the purpose of avoiding the complexity.

The ring member 54 comprises a cylindrical base plate 54a holding the inner pipe 52 and a rib 54b rising from the base plate 54a. The ring member 54 is constructed of two pieces of half ring for convenience of a mounting. These two pieces of half ring surround the periphery of the inner pipe 52 and are bolted so that the ring member 54 is fixed on the inner pipe 52. The outer wall of the inner pipe 52 is covered with the polyethylene member 57 as mentioned above. The inner wall of the ring member 54 is equipped with a rubber plate 61 so as not to damage the polyethylene member 57 when the ring member 54 is fixed. The rubber plate 61 is also put into the portion of two pieces of half ring of the ring member 54 to be bolted. The rib 54b of the ring member 54 is equipped with a grout hose insertion hole or aperture 54c.

The ring member 54 is arranged, as shown in FIG. 19, in such a manner that the rubber plate 63 is fastened on the rib 54b and the inner wall of the outer pipe 53 directly contacts with the rubber disc 63. The rubber disc 63 is used for the purpose of avoiding such a situation that in a case where the inner pipe 52 and the outer pipe 53 are arranged on a concentric circle basis, which will be described later, when a space between the inner pipe 52 and the outer pipe 53 is filled with cement milk, the filling cement milk is leaked in excess over space partitioned by two pieces of the ring member 54 into the neighboring spaces. In this case, it is sufficient that only the space of the coupled portion of the two double walled pipes 51 and 51' is filled and in addition a back filling is simply conducted, and there is no need to fill the space sandwiched between two pieces of the ring member 54 included in a single double walled pipe 51. In a case where the inner pipe 52 and the outer pipe 53 are not arranged on a concentric circle basis, however, the ring member 54 does not serve to prevent the cement milk from flowing into the neighboring spaces over the space partitioned by the ring members 54. Consequently, in this case, even if it is intended to fill with cement milk only the coupled portion of two double walled pipes, the cement milk will flow through a space of the ring members 54 into the neighboring spaces. As a result, the cement milk is filled over the space sandwiched between the inner pipe 52 and the outer pipe 53 in its entirety, and in addition the back filling is conducted. The outer pipe 53 is supported by only the rubber disc 63 in the inner wall, so that the outer pipe 53 may reliably and readily slide relative to the inner pipe 52 and the ring members 54.

FIGS. 20(A)–20(F) are typical illustrations useful for explanation of a jacking execution procedure of burying underground the double walled pipe having the structure shown in FIGS. 14 to 19.

Figure 20A:
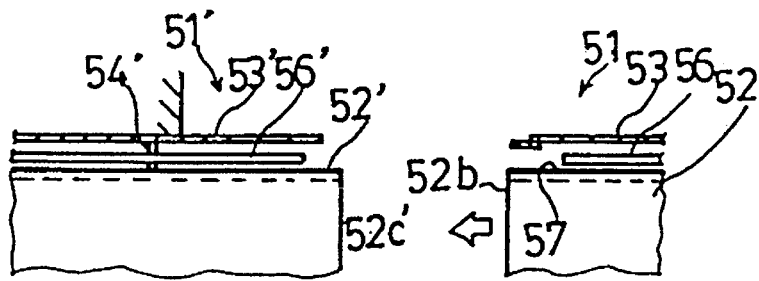
FIGS. 20(A)–20(F) are typical illustrations useful for explanation of a propulsion execution procedure of burying underground the double walled pipe having the structure shown in FIGS. 14 to 19.

As shown in FIG. 20(A), assume that the preceding double walled pipe 51' has been propelled underground in accordance with a jacking method and a part of the rear end thereof is projected into a shaft. The subsequent double walled pipe 51 is prepared in connection with the preceding double walled pipe 51' of which a part of the rear end is projected into the shaft, and is disposed in such a manner that the front end plane 52b of the inner pipe 52 of the double walled pipe 51 and the back end plane 52c' of the inner pipe 52' of the double walled pipe 51' are coupled to each other (refer to FIG. 14).

Figure 20B:
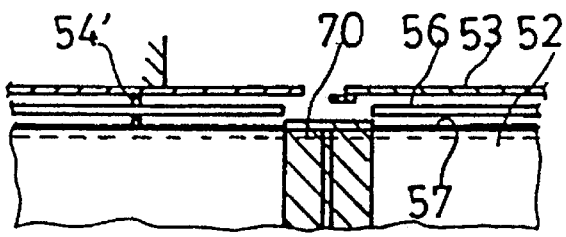

In the next step, as shown in FIG. 20(B), the front end plane 52b of the inner pipe 52 of the double walled pipe 51 and the back end plane 52c' of the inner pipe 52' of the double walled pipe 51', which are coupled to each other, are welded. The state after the welding is inspected by a X ray. When passing inspection, the portion undergone the welding is covered with a polyethylene tube 70. Incidentally, as aforementioned, the outside face of the inner pipe 52, also including portions other than the portion undergone the welding, is covered with the polyethylene member 57.

Figure 20C:
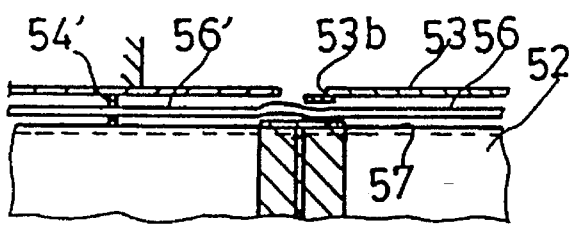

In the next step, as shown in FIG. 20(C), the grout hoses 56 of the double walled pipe 51 and the double walled pipe 51' are connected to each other. Incidentally, with respect to a pair of grout hoses which will be finally located at the middle or its vicinity when a multiple connection of the grout is completed through the pipe jacking, they are left not to be connected so that the connected grout hoses can be separately drawn half-and-half at the front and rear in a jacking direction, respectively.

Figure 20D:
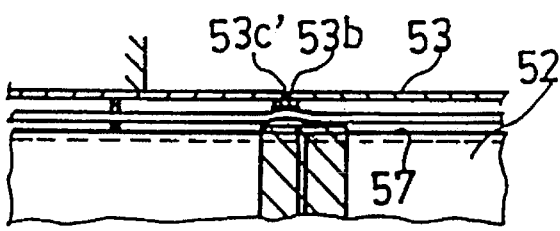

Thereafter, the outer pipe 53 is slid forwardly relative to the inner pipe 52 and the ring member 54 until it takes a state shown in FIG. 20(D) from the state shown in FIG. 20(C), so that the front end plane 53b of the outer pipe 53 is coupled to the back end plane 53c' of the outer pipe 53'.

Figure 20E:
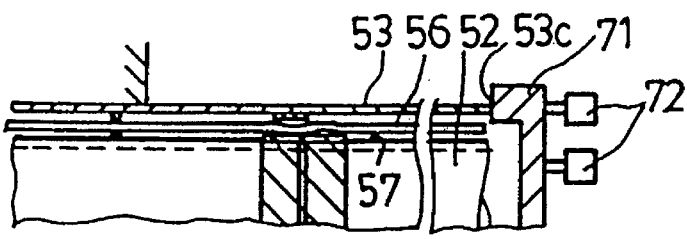

In the next step, as shown in FIG. 20(E), a push wheel 71 is fitted to the rear end of the double walled pipe 51 so as to couple with only the rear end plane 53c, a propulsion oil jack 72 is set to push the push wheel 71, and the double walled pipe 51 is propelled underground, upon acting on the outer pipe 53 with the thrust, together with the double walled pipe 51' and the further preceding double walled pipes. The front end portion of the first stage of double walled pipe is mounted with an excavation head (not illustrated), thereby propelling while digging. It is acceptable that setting of the push wheel 71 and the propulsion oil jack 72 is conducted prior to sliding of the outer pipe 53, and the outer pipe 53 is slid by the propulsion oil jack 72.

Figure 20F:
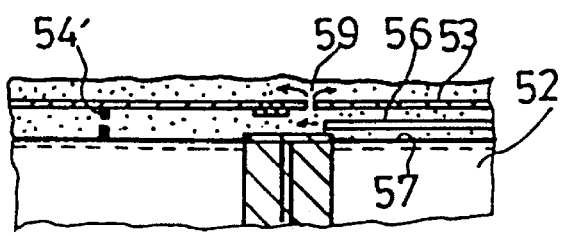

After a series of processes as mentioned above is repeatedly applied for a number of double walled pipes, the cement milk is flowed into the grout hose 56 (refer to FIG. 15) so as to fill a space between the ring member-to-ring member and a space partitioned by outside face of the inner pipe 52 and the inner wall of the outer pipe 53, while the grout hose is sequentially drawn in such a manner that the top of the grout hose is sequentially disposed between the ring member-to-ring member of the multiple connection of double walled pipes. In this case, when the grout hose 56 is drawn backwards in the pipe jacking direction, in order to prevent the cement milk from overflowing through the grout hose insertion opening 54c (refer to FIG. 17) of the forward ring member of the preceding double walled pipes, it is preferable to close the opening 54c. When the respective spaces are filled with the cement milk, water, earth and sand, etc., which creep between the inner pipe 52 and the outer pipe 53, are exhausted by the cement milk out of the outer pipe 53 via the check valve 59, and in addition the cement milk itself also flows out via the check valve 59, whereby the outside face of the outer pipe 53 is also covered with the cement milk, as shown in FIG. 20(F). Thus, it is possible to provide the underground pipe with greater toughness, and in addition to prevent a settlement of the ground level.

According to the present embodiment, while the grout hose 56 has been inserted into the opening 54c provided on the ring member 54, the present invention does not exclude an insertion of the grout hose itself before filling the cement milk after the pipe jacking. In such a case, the opening 54c of the ring member 54 is beforehand equipped with a tube having a cement milk flow aperture, and in step shown in FIG. 20 (C) these tubes are connected, and after completion of the pipe jacking the grout hose is inserted into the tube.

FIG. 21 is a sectional side elevation of a double walled pipe according to the fifth embodiment of the present invention, extending along the longitudinal direction.

Figure 22:
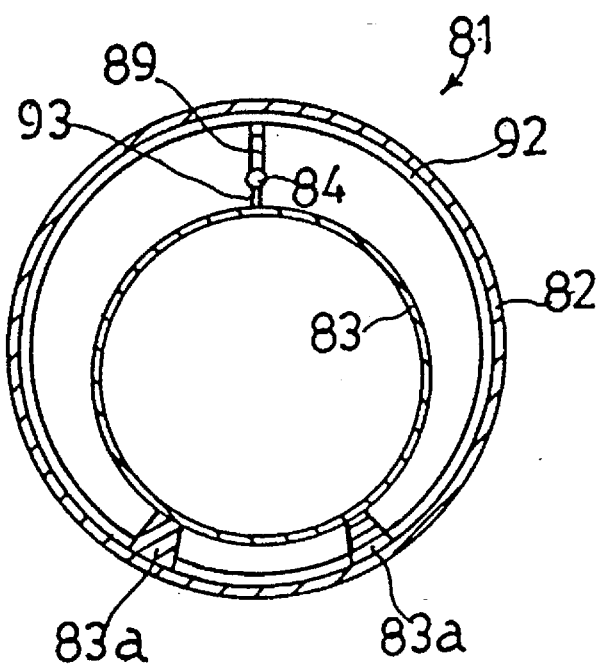
FIG. 22 is a sectional view taken along the line E—E of FIG. 21.
Figure 23:
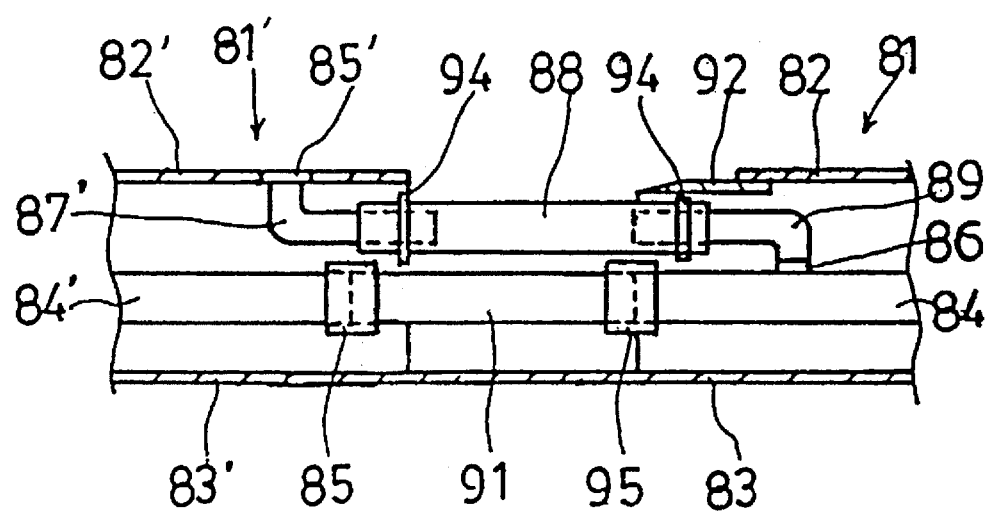
FIG. 23 is an enlarged sectional side elevation of a portion circled by a dashed line F of FIG. 21.

FIG. 22 is a sectional view taken along the line E—E of FIG. 21. FIG. 23 is an enlarged sectional side elevation of a portion circled by a dashed line F of FIG. 21.

FIG. 21 shows a preceding double walled pipe 81' which has been propelled underground and of which only a part of the rear end is projected into a shaft, and a subsequent double walled pipe 81 which is to be coupled to the rear end of the preceding double walled pipe 81' and to be propelled underground together with the double walled pipe 81'. These propulsion double pipes 81 and 81' each have the same structure.

The double walled pipe 81 comprises an outer pipe 82 and an inner pipe 83 disposed inside of the outer pipe 82. The inner pipe 83 is disposed inside of the outer pipe 82 vis a supporting leg 83*d* which is fixed on the inner pipe 83.

An outer pipe 82' is equipped with a first check valve 85' near the rear end of the outer pipe 82' with respect to the pipe jacking direction. The first check valve 85' permits an one-way flow of a back filling material from the inside of the outer pipe 82' to the outside thereof. Coupled to the first check valve 85' is one end of a first back filling tube 87' extending backwards (right side in FIG. 21) with respect to the pipe jacking direction.

An insertion joint 92 is mounted at the front end of the outer pipe 82. The insertion joint 92 is operative, when the outer pipe 82 of the double walled pipe 81 is propelled and the front end of the the outer pipe 82 is connected to the rear end of outer pipe 82' of the double walled pipe 81', to enter inside of the outer pipe 82' of the double walled pipe 81'. In this manner, the provision of the insertion joint 92 makes it possible to reliably couple the outer pipes 82 and 82' to each other, even if the misalignment exists a little between the outer pipes 82 and 82', since an error is absorbed.

At the periphery of the inner pipe 83, there is provided a filling tube 84 through which concrete passes to fill a space between the outer pipe 82 and the inner pipe 83. The filling tube 84 is fixed on a fixing base 93, and is equipped with a second check valve 86 near the front end of the filling tube 84 with respect to the pipe jacking direction. The second check valve 86 permits an one-way flow of the back filling material from the inside of the filling tube 84 to the outside thereof. Coupled to the second check valve 86 is one end of a second back filling tube 89 extending forwards (left side in FIG. 21) with respect to the pipe jacking direction.

As shown in FIG. 21, after a back end plane 83*b'* of the inner pipe 83' of the preceding double walled pipe 81' and a front end plane 83*a* of the inner pipe 83 of the double walled pipe 81 are coupled to each other, the front end plane 83*a* of the inner pipe 83 and the back end plane 83*b'* of the inner pipe 83' are welded at their coupled portion. After the welding, as shown in FIG. 23, the filling tube 84' of double walled pipe 81' and the filling tube 84 of the double walled pipe 81 are connected each other through a coupling tube 91 both ends of which are fixed on the filling tubes 84 and 84' by ring members 95 and 95', respectively. Further, the first back filling tube 87' of the double walled pipe 81' and a second back filling tube 89 of the double walled pipe 81 are connected through a flexible pipe 88 both ends of which are clamped on the first back filling tube 87' and a second back filling tube 89 by clamped bands 94' and 94, respectively.

FIG. 21 shows a state that the inner pipes 83 and 83' are welded, the filling tubes 84 and 84' are connected, and the back filling tubes 89 and 87' have been connected. After the state shown in FIG. 21, the outer pipe 82 of the double walled pipe 81 is propelled to move in the pipe jacking direction (left in FIG. 21), so that the insertion joint 92 mounted on the tip of the outer pipe 82 slides inside of the rear end of the outer pipe 82' of the propulsion double pipe 81', whereby the double walled pipes 81 and 81' are reliably coupled to each other. In the coupling, the sliding occurs between the supporting leg 83*d* and the inside of the outer pipe 82. After the coupling, the outer pipe 82 of the double walled pipe 81 is further propelled so that the double walled pipes 81 and 81' are propelled under the ground. Even if there occurs during the pipe jacking a relative rotation between the outer pipes 82, 82' and the inner pipes 83, 83', it does not happen that the first back filling tube 87' and the second back filling tubes 89 are damaged or broken, since the flexible pipe 88, which connects the first back filling tube 87' and the second back filling tubes 89 each other, has a flexibility. Further, since the double walled pipes 81 and 81' are equipped with the first check valves 85 and 85', respectively, it is possible to avoid such a situation that earth and sand or the like crept in the back filling tubes during the pipe jacking. After the pipe jacking, a series of processes as mentioned above is repeatedly applied for a plurality of double walled pipes.

Inside of the filling tubes 84 and 84', there is provided a hose (not illustrated) adapted to flow concrete for a back filling of the periphery of the outer pipes 82 and 82'. The hose is connected to a so-called double packer (not illustrated) which is located inside of the filling tube 84 of the double walled pipe 81 at the front end thereof. The double packer serves to exhaust the back filling concrete out of the outer pipes 82 and 82' via the second check valve 86, the back filling tube, and first check valve 85 or 85'. After the back filling process, there will still remain the concrete inside of the back filling tube. However, the second check valve 86 prevents the the remaining concrete from returning into the filling tubes 84 and 84'. Thus, it may be avoided that the inside of the filling tubes 84 and 84' is stopped up with the concrete used for back filling. Consequently, after the back filling, it is possible to flow through the filling tubes 84 and 84' a middle filling concrete for filling a space between the outer pipes 82, 82' and the inner pipes 83, 83'. Further, even if there occurs during the middle filling a relative rotation between the outer pipes 82, 82' and the inner pipes 83, 83', it does not happen that the back filling tubes are damaged or broken, since the flexible pipe 88 has a flexibility.

Incidentally, according to the present embodiment, the inner pipe 83 is simply disposed inside of the outer pipe 82. The present invention is not restricted to an application for only a case where the inner pipe 83 is simply disposed inside of the outer pipe 82, and does not exclude other applications, for example, to a double walled pipe 81 and the like which is equipped with such an arrangement that a predetermined intermediate member is provided between the inner pipe 83 and the outer pipe 82, so that a relative positioning between the inner pipe 83 and the outer pipe 82 is conducted by the intermediate member, and the inner pipe 83 and the outer pipe 82 may be relatively slid.

Figure 24:
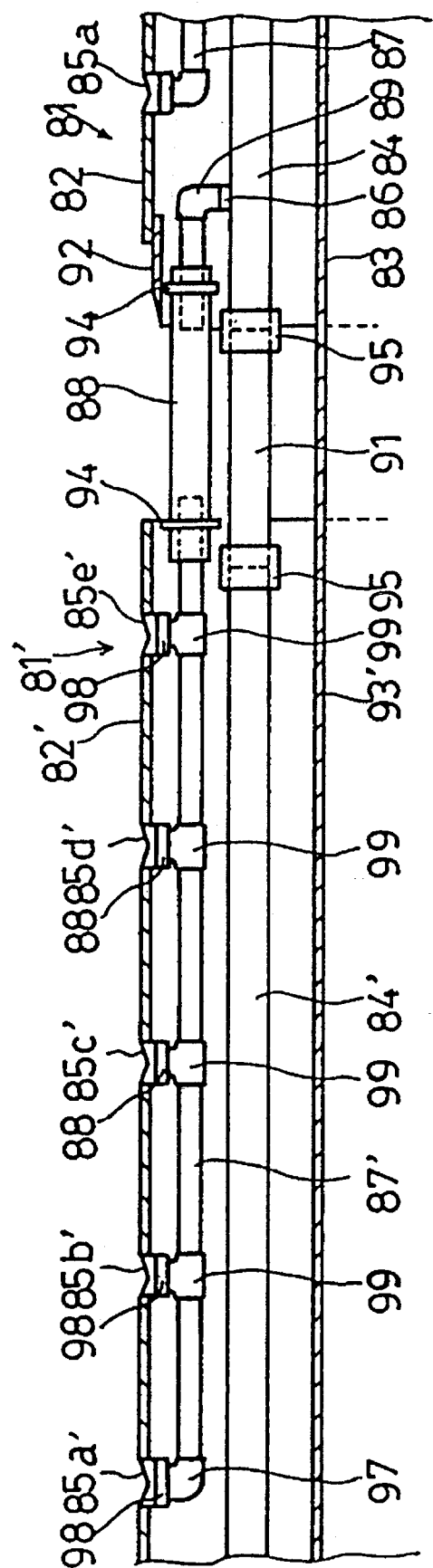
FIG. 24 is a sectional side elevation of a propulsion double pipe according to the sixth embodiment of the present invention, extending along the longitudinal direction.
Figure 25:
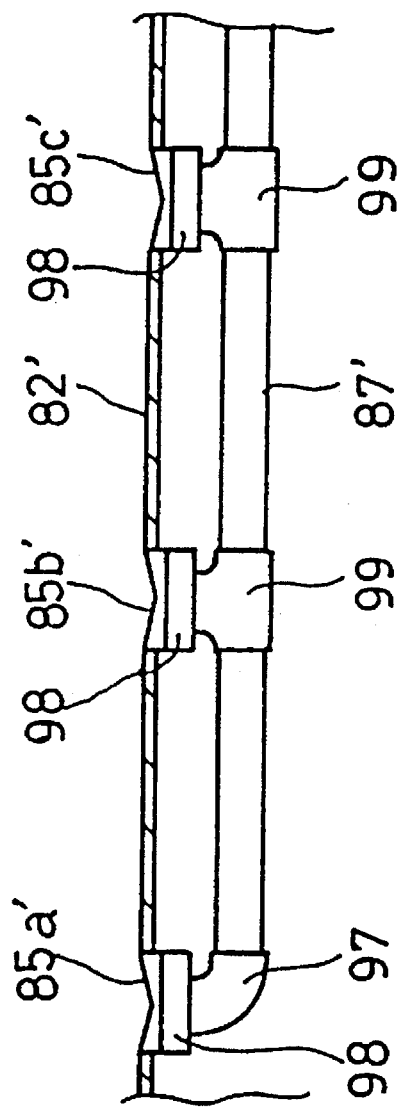
FIG. 25 is a partially enlarged view of first check valves as constituent parts of the double walled pipe shown in FIG. 24.

FIG. 24 is a sectional side elevation of a double walled pipe according to the sixth embodiment of the present invention, extending along the longitudinal direction. FIG. 25 is a partially enlarged view of first check valves 85*a*~85*c'* as constituent parts of the double walled pipe shown in FIG. 24. In these figures, the same parts are denoted by the same reference numbers as those in FIGS. 21, 22 and 23 involved in the fifth embodiment, and the redundant description will be omitted.

The outer pipe 82' shown in FIG. 24 is equipped with five pieces of first check valve 85*a'*–85*e'* which are disposed in series in a longitudinal direction. Of these five pieces of first check valve 85*a'*–85*e'*, the first check valve 85*a'* is connected through a socket joint 98 and an elbow joint 97 to the first back filling tube 87'. The remaining other first check valves 85*b'*–85*e'* each are connected through a socket joint 98 and a T-piece 99 to the first back filling tube 87'.

The five pieces of first check valve 85*a'*–85*e'* shown in FIG. 24 each are mounted at an adequate point of the outer pipe 82' in accordance with a soil condition of an area where the double walled pipe 81 is to be buried, so that concrete for back filling may be effectively sent out from these first check valve 85a'85e'. Thus, it is possible to expect an effect of the back filling, for example, an enhancement of a reliability of the reinforcement of the double walled pipes.

Figure 26:
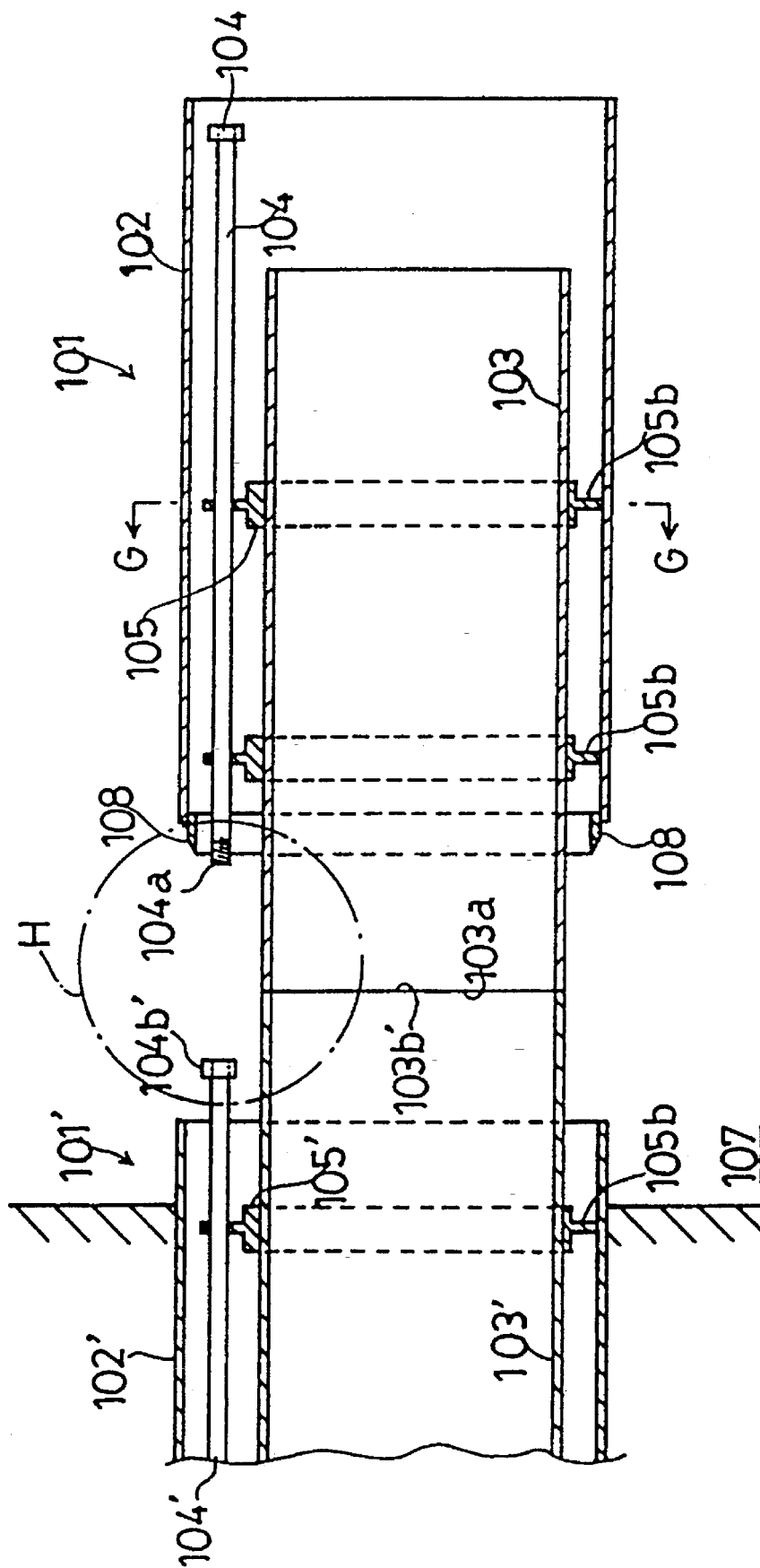
FIG. 26 is a sectional side elevation of a propulsion double walled pipe according to the seventh embodiment of the present invention, extending along the longitudinal direction.
Figure 27:
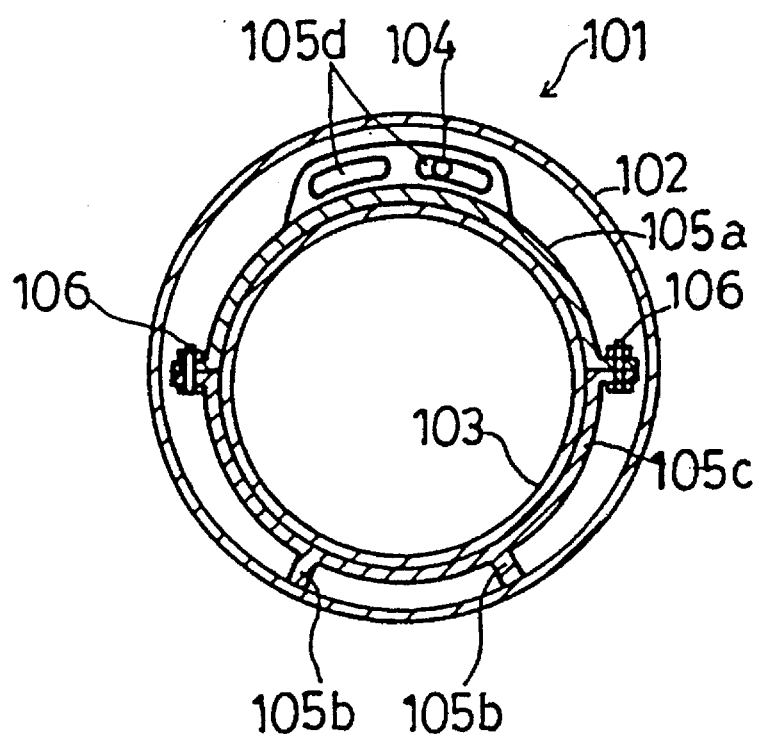
FIG. 27 is a sectional view taken along the line G—G of FIG. 26.

FIG. 26 is a sectional side elevation of a double walled pipe according to the seventh embodiment of the present invention, extending along the longitudinal direction. FIG. 27 is a sectional view taken along the line G—G of FIG. 26.

FIG. 26 shows a preceding double walled pipe 101' which has been propelled underground and of which only a part of the rear end is projected into a shaft, and a subsequent double walled pipe 101 which is to be coupled to the rear end of the the preceding double walled pipe 101' and to be propelled underground together with the double walled pipe 101'. These double walled pipes 101 and 101' each have the same structure.

The double walled pipe 101 comprises an outer pipe 102, an inner pipe 103 disposed inside of the outer pipe 102, and two pieces of rib band 105 surrounding the periphery of the inner pipe 103. The two pieces of rib band 105 each are provided with two elliptic holes 105d (refer to FIG. 27) through which an auxiliary pipe arrangement 104 is slidingly inserted. The auxiliary pipe arrangement 104 is provided with a male screw at an outer wall of the tip 104a thereof with respect to the propellent direction (left FIG. 26) and a female screw at an inner wall of the rear end 104b thereof with respect to the propellent direction.

The outer pipe 102 is provided with an insertion joint 108 at the top thereof with respect to the pipe jacking direction. The insertion joint 108 is operative, when the outer pipe 102 of the double walled pipe 101 is propelled and the front end of the outer pipe 102 is connected to the rear end of outer pipe 102' of the double walled pipe 101', to crept inside of the outer pipe 102' of the double walled pipe 101'. In this manner, the provision of the insertion joint 108 makes it possible to reliably couple the outer pipes 102 and 102' to each other, even if the misalignment exists a little between the outer pipes 102 and 102', since an error is absorbed.

As shown in FIG. 27, the rib band 105 comprises an upper rib band 105a and a lower rib band 105c. These upper rib band 105a and lower rib band 105c are urged each other by a bolt 106 so that the rib band 105 is fixed to the inner pipe 103. The upper rib band 105a is equipped with two elliptic holes 105d at its upper part. These elliptic holes 105d extend in a peripheral direction of the inner pipe 103. The auxiliary pipe arrangement 104 is slidingly inserted into the right side of elliptic hole 105d. The lower rib band 105c is equipped with two supporting legs 105b at its lower part. The inner pipe 103 is disposed inside of the outer pipe 102 through the supporting legs 105b.

FIG. 26 shows a state that the rear end 103b' of the inner pipe 103' of the double walled pipe 101' and the front end 103a of the inner pipe 103 of the double walled pipe 101 are coupled each other and has been welded.

Figure 28:
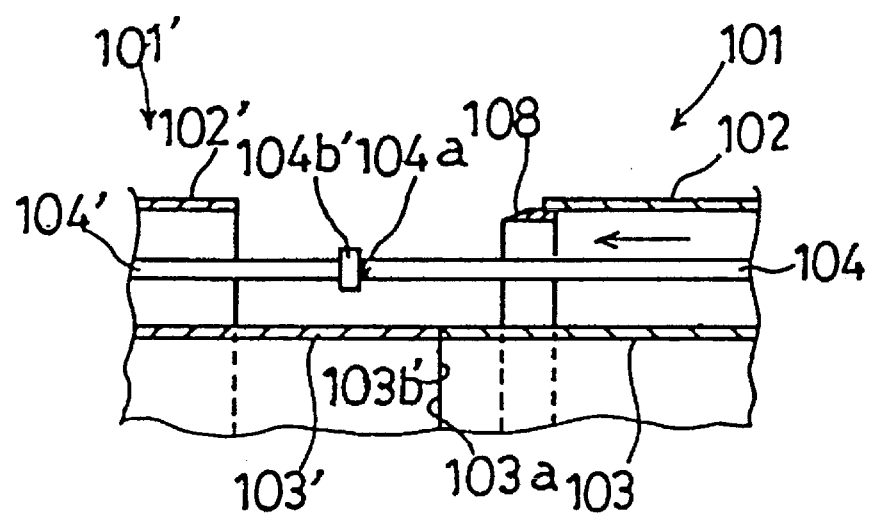
FIG. 28 is an enlarged sectional side elevation of a portion circled by a dashed line H of FIG. 26, in a state that auxiliary pipe arrangements are coupled together.

FIG. 28 is an enlarged sectional side elevation of a portion circled by a dashed line H of FIG. 26, in a state that auxiliary pipe arrangements are slid in the pipe jacking direction and directly coupled together.

The auxiliary pipe arrangement 104 of the double walled pipe 101 is slid in the pipe jacking direction shown by the arrow from a state as shown in FIG. 26 so that the tip of the auxiliary pipe arrangement 104 is coupled to the rear end 104b' of the auxiliary pipe arrangement 104' of the double walled pipe 101'. It happens that there occurs during the pipe jacking a relative rotation between the inner pipe 103' of the preceding double walled pipe 101' and the outer pipe 102' thereof. However, even if the misalignment exists a little between the auxiliary pipe arrangements 104 and 104', it is possible to reliably position the auxiliary pipe arrangements 104 and 104', since the auxiliary pipe arrangement 104 is inserted into the elliptic hole 105d extending in a peripheral direction of the inner pipe 103. Thus, the auxiliary pipe arrangements 104 and 104' may be readily connected by means of, for example, screw-operating the male screw of the rid 104a of the auxiliary pipe arrangement 104 and the female screw of the rear end 104b' of the auxiliary pipe arrangement 104'. As another fashion, it is acceptable to connect the auxiliary pipe arrangements 104 and 104' through a nipple (not illustrated).

After the auxiliary pipe arrangements 104 and 104' are connected, the outer pipe 102 of the double walled pipe 101 is propelled so that the insertion joint 108 of the front end of the outer pipe 102 with respect to the pipe jacking direction crepts inside of the outer pipe 102' of the double walled pipe 101', whereby the outer pipes 102 and 102' are reliably connected together. After the connection, the outer pipe 102 is further propelled so that the double walled pipe 101 is propelled underground. After the pipe jacking, a series of processes as described above is repeatedly conducted, so that a plurality of double walled pipes 101 are sequentially pushed.

A space between the inner pipe 103 and outer pipe 102 of the plurality of double walled pipes 101 after the pipe jacking is filled with concrete or the like through one end (not illustrated) of the auxiliary pipe arrangements 104, so that the inner pipe 103 and outer pipe 102 are fixed. According to this arrangement, since the auxiliary pipe arrangements 104 are directly coupled together, it is possible to expect a satisfactory passage of the concrete through the space including the connected portion of the auxiliary pipe arrangements 104 even the concrete passes through the auxiliary pipe arrangements 104 upon the filling.

Incidentally, according to the present embodiment, the inner pipe 103 is simply disposed inside of the outer pipe 102. The present invention is not restricted to an application for only a case where the inner pipe 103 is simply disposed inside of the outer pipe 102, and does not exclude other applications, for example, to a double walled pipe and the like which is equipped with such an arrangement that a predetermined intermediate member is provided between the inner pipe 103 and the outer pipe 102, so that a relative positioning between the inner pipe 103 and the outer pipe 102 is conducted by the intercalary member, and the inner pipe 103 and the outer pipe 102 may be relatively slid.

Further, according to the present embodiment, while the auxiliary pipe arrangements are explained in the form of a so-called middle filling tube, the auxiliary pipe arrangements in the present invention is not restricted in the use, and does not excludes other use, for example, it is acceptable to be used as a back filling tube for covering the outside of the outer pipe with concrete or the like, or a tube for passing a long object, such as a rope and a cable, according to the necessity.

Figure 29:
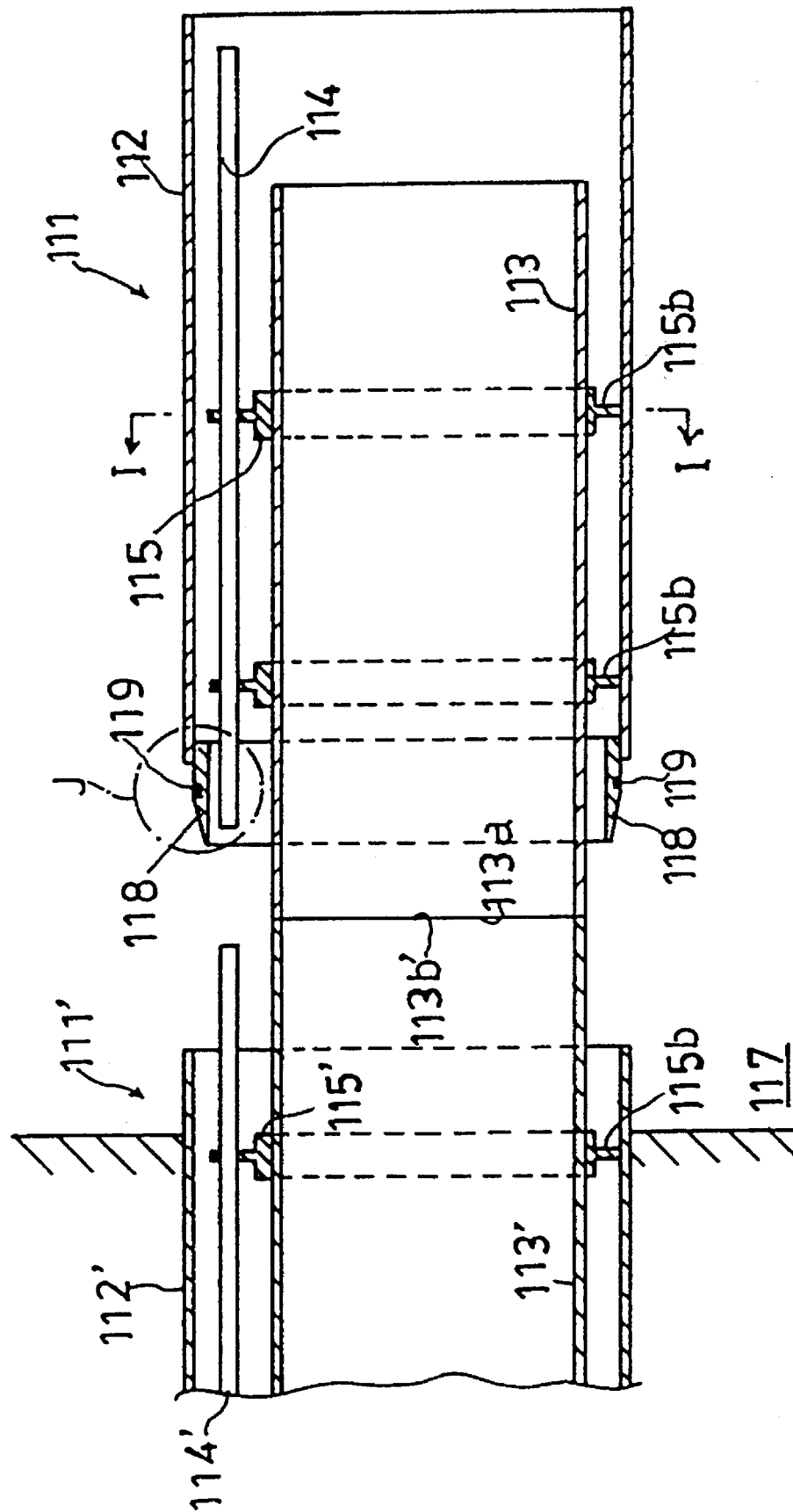
FIG. 29 is a sectional side elevation of a double walled pipe according to the eighth embodiment of the present invention, extending along the longitudinal direction.

FIG. 29 is a sectional side elevation of a double walled pipe according to the eighth embodiment of the present invention, extending along the longitudinal direction.

Figure 30:
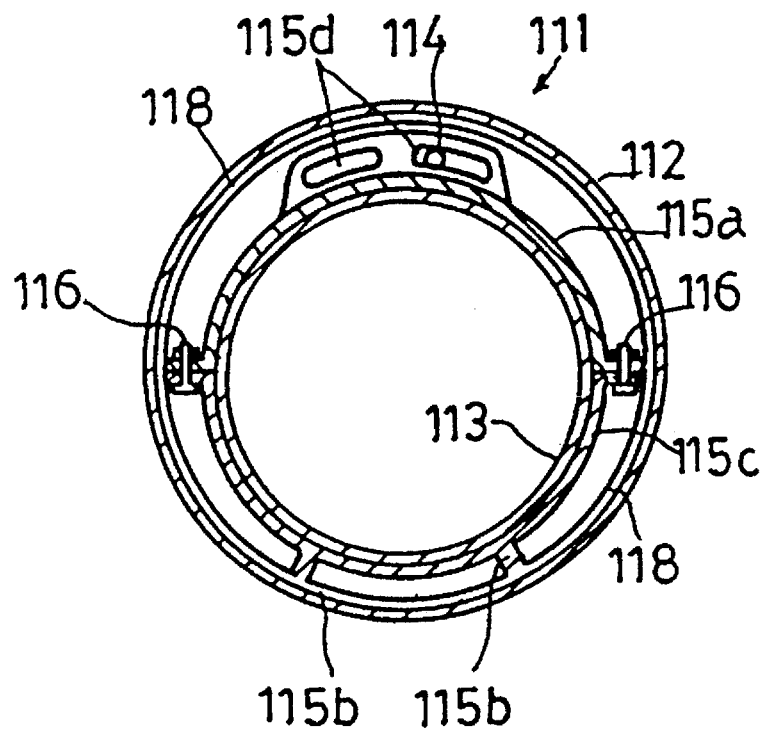
FIG. 30 is a sectional view taken along the line I—I of FIG. 29.
Figure 31:
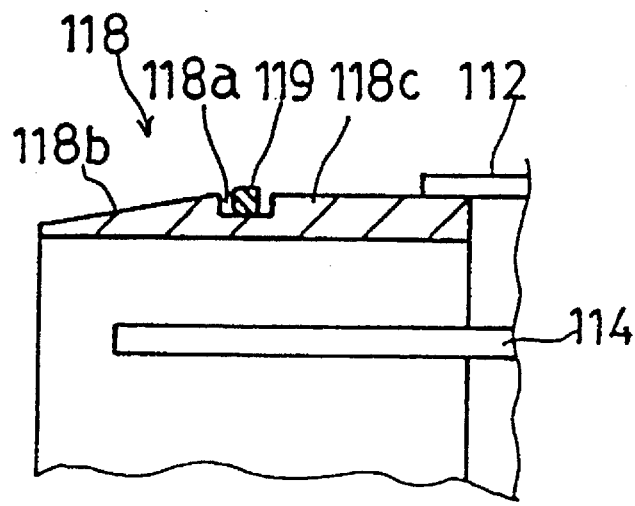
FIG. 31 is an enlarged sectional side elevation of a portion circled by a dashed line J of FIG. 29.

FIG. 30 is a sectional view taken along the line I—I of FIG. 29. FIG. 31 is an enlarged sectional side elevation of a portion circled by a dashed line J of FIG. 29.

FIG. 29 shows a preceding double walled pipe 111' which has been propelled underground and of which only a part of the rear end is projected into a shaft, and a subsequent propulsion double pipe 111 which is to be coupled to the rear end of the preceding double walled pipe 111' and to be propelled underground together with the double walled pipe 111'. These double walled pipes 111 and 111' each have the same structure.

The double walled pipe 111 comprises an outer pipe 112, an inner pipe 113 disposed inside of the outer pipe 112, and two pieces of rib band 115 surrounding the periphery of the inner pipe 113. As shown in FIG. 30, the rib band 115 comprises an upper rib band 115a and a lower rib band 115c. These upper rib band 115a and lower rib band 115c are secured each other by a bolt 116 so that the rib band 115 is fixed to the inner pipe 113. The upper rib band 115a is equipped with two elliptic holes 115d at its upper part. These elliptic holes 115d extend in a peripheral direction of the inner pipe 113, and penetrate in the longitudinal direction of the inner pipe 113. Inserted into the the right side of elliptic hole 115d is an auxiliary pipe arrangement 114 adapted for passing concrete to fill a space between the outer pipe 112 and inner pipe 113. The lower rib band 115c is equipped with two supporting legs 115b at its lower part. The inner pipe 113 is disposed inside of the outer pipe 112 through the supporting legs 115b.

The outer pipe 112 is provided with a ring member 118 at the tip thereof with respect to the pipe jacking direction (left side in FIG. 29). The ring member 118 is disposed in such a way that one end of the ring member is inserted from a tip of the outer pipe 112 into the inside thereof to be fixed on an inside face thereof and the another end is projected from the tip of the outer pipe 112. The projected portion of the ring member 118 is formed, as shown in FIG. 31, with a flat section 118c having a surface aligning with the inside face of the outer pipe 112, and a taper section 118b inclined left downwards from the flat section 118c. The flat section 118c is equipped with a groove or channel 118a surrounding the periphery of the ring member 118. A rubber ring 119 is engaged with the channel 118a.

FIG. 29 shows a state that the rear end 113b' of the inner pipe 113' of the double walled pipe 111' and the front end 113a of the inner pipe 113 of the double walled pipe 111 are coupled each other and has been welded. Thereafter, the auxiliary pipe arrangement 114' of the double walled pipe 111' and the auxiliary pipe arrangement 114 of the double walled pipe 111 are connected each other.

The rear end plane 113b' of the inner pipe 113 and the front end plane 113a of the inner pipe 113 are welded. The state after the welding is inspected by a X ray. When a welding failure is found on the welded portion, the welding material of the failure portion is subjected to gousing and the same portion is again welded. Thereafter, the inspection is again conducted on the re-welded portion. If the welding failure is found again on the re-welded portion, the inner pipes 113' and 113 are cut off by a certain length with the welded portion in the center, since there is a possibility that a heating for welding twice over affords the inner pipes 113' and 113 on the vicinity of the portion undergone the welding a variation in mechanical characters. Now, the rear end plane 113b' of the cutting inner pipe 113' and the front end plane 113a of the cutting inner pipe 113 are welded. Incidentally, according to the sort of tubes, it is acceptable not to cut off the welded portion of the inner pipes when the failure for the second takes place, but to cut off the welded portion of the inner pipes when the failure for a predetermined number of times such as third time or more takes place.

In this manner, if the inner pipes 113' and 113 are partially cut off, the outer pipes 112' and 112 will become longer than the inner pipes 113' and 113, respectively. Hence, it is necessary for the outer pipes 112' and 112 to be cut off by the corresponding length of the cut off parts of the inner pipes 113' and 113, respectively.

To cut off the outer pipes 112' or 112, there are considered, as a cut off point thereof, three points such as the rear end of the outer pipe 112' of the preceding double walled pipe 111', the front end of the outer pipe 112 of the subsequent double walled pipe 111, or the rear end of the outer pipe 112 of the subsequent double walled pipe 111. If the rear end of the outer pipe 112' is cut off, this involves such a danger that the inner pipe 113' is damaged due to the heat or the like generating at the time of cutting off. It is similar also in a case where the front end of the outer pipe 112 is cut off. In this case, since the ring member 118 must be again mounted on the tip of the cut part, it will take much time. Whereas, if the rear end of the outer pipe 112 is cut off, this involves no danger such that the inner pipe 113 is damaged, since there is no inner pipe at the rear end of the outer pipe 112. In view of the foregoing, it is preferable to cut off the rear end of the outer pipe 112.

Figure 32:
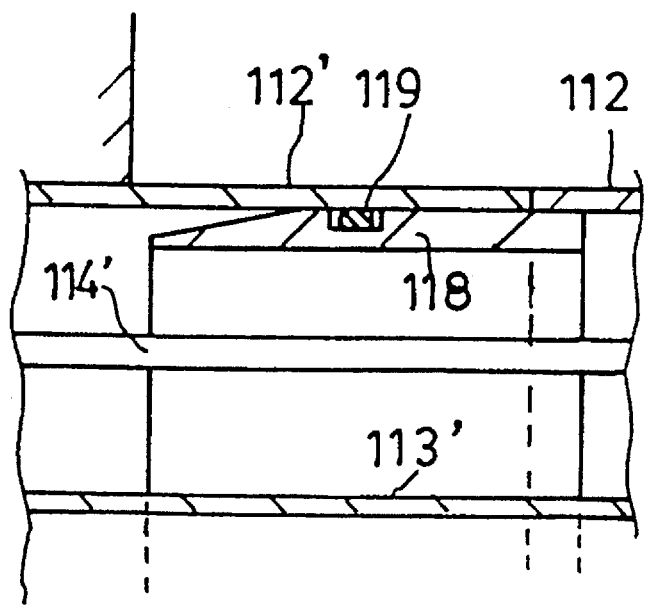
FIG. 32 is a view showing a state that a ring member has been inserted into the rear end of the outer pipe of the front in a pipe jacking direction.

FIG. 32 is a view showing a state that a ring member 118 has been inserted into the rear end of the outer pipe 112' of the front in a pipe jacking direction upon jacking of the outer pipe 112.

At the top, with respect to the pipe jacking direction, of the outer pipe 112 of the double walled pipes 111, there is provided the ring member 118. A major diameter of the taper section 118b of the ring member 118 is smaller than that of the inner periphery of the outer pipe 112'. Consequently, as the outer pipe 112 is propelled, the ring member 118 is readily inserted into the inside of the outer pipe 112'. Hence, it is possible to reliably couple the outer pipes 112 and 112' to each other, even if a misalignment exists a little between the outer pipes 112 and 112'. Further, since the rubber ring 119 of the ring member 118 is placed in contact with the inside face of the outer pipe 112' in condition that the ring member 118 is inserted into inside of the outer pipe 112', the coupling portion of the outer pipes 112 and 112' is sealed by the rubber ring 119.

After the state shown in FIG. 32, the double walled pipe 111 is propelled underground, upon acting on the outer pipe 112 with the further thrust. After the pipe jacking, the similar process as mentioned above is repeatedly performed so that a plurality of double walled pipes 111 are sequentially propelled. A space between the inner pipe 113 and the outer pipe 112 of the double walled pipe 111 after the pipe jacking is filled with concrete or the like through one end (not illustrated) of the auxiliary pipe arrangement 114, so that the inner pipe 113 and the outer pipe 112 are fixed together. Since the rubber ring 119 seals the connected section of the outer pipe-to-outer pipe, it does not happen that ground water or the like intrudes into the space between the inner pipe 113 and the outer pipe 112 through such a connected section. Therefore, the space between the inner pipe 113 and the outer pipe 112 may be filled up with concrete or the like. Incidentally, it is considered that after the double walled pipes 111 are buried, a quality of the rubber ring 119 is deteriorated, as a result, a sealing of the couped section of the outer pipe-to-outer pipe becomes insufficient. In such a case, however, this involves no problem, since the concrete filled between the inner pipe 113 and the outer pipe 112 has been already harden.

According to the present embodiment, while there is provided the channel 118a only one piece on the flat section 118c of the ring member 118, the present invention does not exclude the use of a plurality of channels to ensure a sealing of a space between the inner periphery of the outer pipe and the ring member with greater reliability.

Incidentally, according to the present embodiment, the inner pipe 113 is simply disposed inside of the outer pipe 112. The present invention is not restricted to an application for only a case where the inner pipe 113 is simply disposed inside of the outer pipe 112, and does not exclude other applications, for example, to a double walled pipe and the like which is equipped with such an arrangement that a predetermined intermediate member is provided between the inner pipe 113 and the outer pipe 112, so that a relative positioning between the inner pipe 113 and the outer pipe 112 is conducted by the intermediate member.

Figure 33:
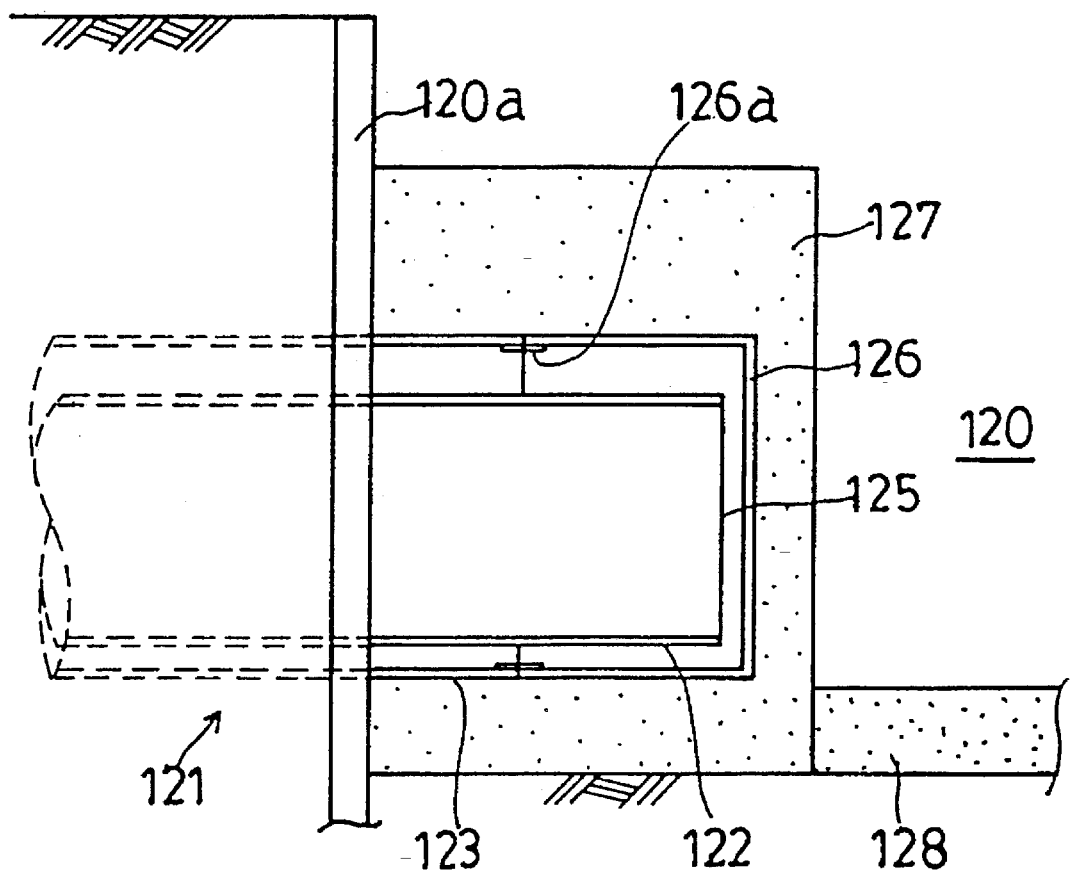
FIG. 33 is a view useful for understanding a jacking method of a double walled pipe according to an embodiment of the present invention.

FIG. 33 is a view useful for understanding a pipe end structure of a leading pipe according to an embodiment of the present invention.

A double walled pipe 121 has been propelled underground through a shaft 120 toward left in the figure, using a jacking apparatus (not illustrated). To propel the double walled pipes, there is constructed a bearing wall (not illustrated) on a side wall located over against a side wall 120a. The double walled pipe 121 is pushed by the jacking apparatus until a rear end of the double walled pipe 121 is kept projecting into the shaft 120, as shown in FIG. 33, while causing the bearing wall to bear a reaction force of the jacking. In pipe jacking, in order to avoid such a situation that an inner pipe 122 is damaged, the double walled pipe 121 is propelled upon acting on only the rear end of an outer pipe 123 with the thrust. After completion of the pipe jacking, the rear end of the inner pipe 122 of the double walled pipe 121 is capped with a protection cap 125. Further, the rear end of the double walled pipe 121 is capped with a protection tube 126 at a distance from the protection cap 125. After capping of the protection tube 126, a bearing wall 127 is constructed in such a manner that concrete is slashed so as to cover the rear end of the double walled pipe 121 and the protection tube 126 and in addition to contact with the side wall 120a.

While the double walled pipe (not illustrated) is propelled underground from the side wall located over against the side wall 120a while causing the bearing wall 127 to bear a reaction force of the jacking apparatus (not illustrated), in such a case, after a bearing wall (not illustrated), which is constructed on the side wall located over against the side wall 120a, is demolished, the double walled pipe is propelled underground from the side wall located over against the side wall 120a. In pipe jacking, in order to prevent the reaction force acting on the bearing wall 127 from applying to the inner pipe 122, the protection tube 126 is capped so as not to contact with the inner pipe 122 at the rear end of the double walled pipe 121. After completion of the propulsion of the double walled pipe, the bearing wall 127 is demolished and the protection tube 126 is taken off from the rear end of the double walled pipe 121, and in addition the protection cap 125 is taken off from the rear end of the inner pipe 122. After these parts are taken off, the double walled pipe 121 shown in FIG. 33 and a double walled pipe propelled from the side wall over against the side wall 120a are connected to each other. In pipe jacking of the double walled pipe, the rear end of the double walled pipe 121 is protected by the protection tube 126. Thus, it is possible to avoid such situations that concrete is adhered on the rear end of the double walled pipe, or water intrudes thereinto. Therefore, it is possible to readily perform the connection of double walled pipe-to-double walled pipe.

In a jacking method for the double walled pipes according to the present embodiment, only a change of the pipe jacking direction of a excavation device (not illustrated), which is set up on a concrete floor 128, permits the double walled pipes to propel in two directions. This feature makes it possible to reduce the cost and the term of works as well. Further, a jacking method according to the present embodiment permits the number of shafts used as only a carry-over shaft but not used as a pipe jacking shaft to be increased. This feature makes it possible to reduce a working amount for preparing the shafts.

When the bearing wall 127 is demolished and the protection tube 126 is taken off from the rear end of the propulsion double pipe 121, according to the present embodiment, it is possible to readily take off the protection tube 126, since the insertion joint 126a is simply inserted inside of the rear end of the double walled pipe 121.

Further, according to the present embodiment, the protection tube 126 is capped on the rear end of the double walled pipe so as not to contact with the inner pipe 122. This feature makes it possible to prevent the inner pipe 122 from being damaged owing to the reaction force of the jacking of the double walled pipes.

Furthermore, while the protection cap 125 is necessarily needed, it is preferable that the protection cap 125 is capped on the rear end of the inner pipe 122, since the protection cap 125 serves to reliably prevent earth and sand or water, etc. from intruding into the inside of the inner pipe 122.

The bearing wall 127 is supported by the side wall 120a and the double walled pipe 121 as well. Thus, it is possible to sufficiently bear the reaction force acting on the jacking apparatus.

Figure 34:
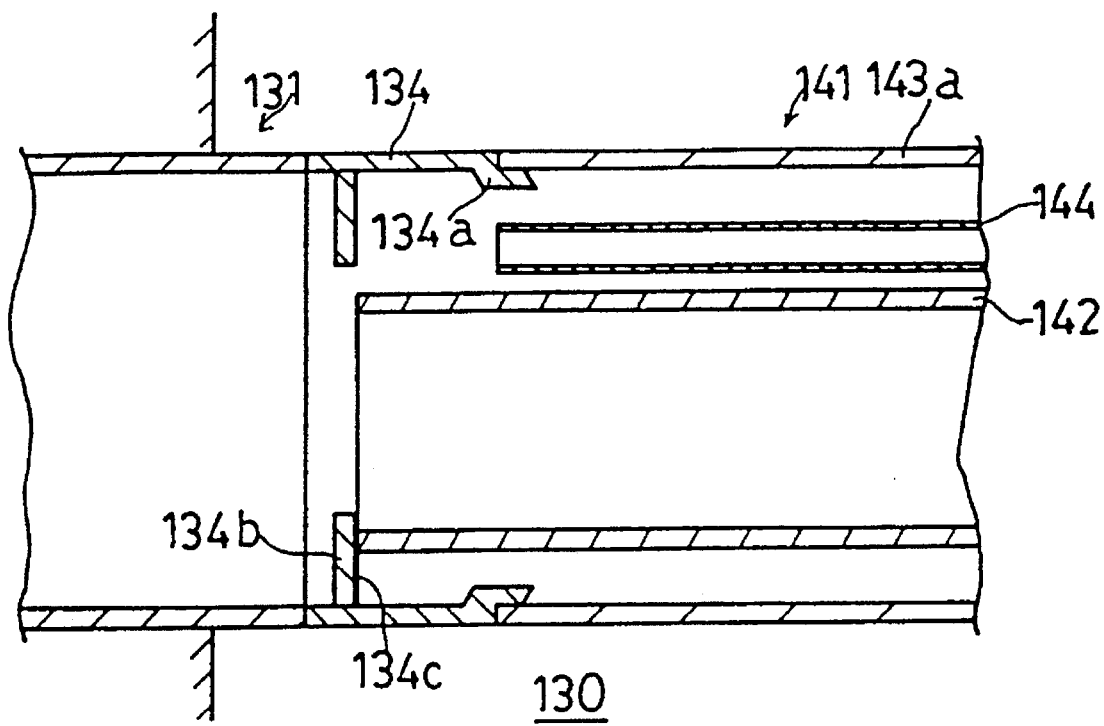
FIG. 34 is a view useful for understanding a pipe end structure of a leading pipe according to an embodiment of the present invention.
Figures 35A, 35B:
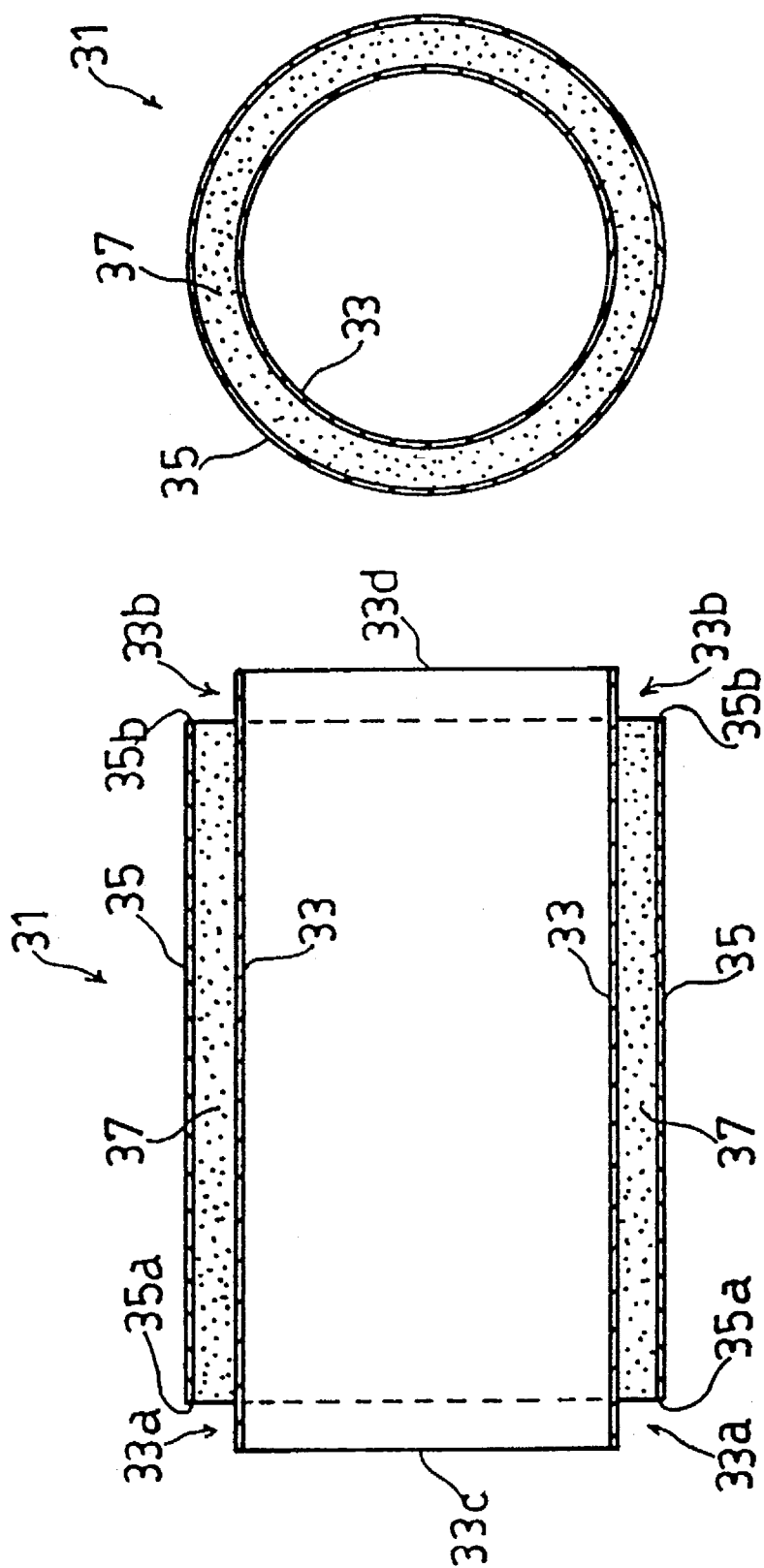
FIGS. 35(A) and 35(B) are a side elevation and a section view, respectively, showing by way of example the conventional double walled steel pipe which will be used in adoption of the jacking method.

FIG. 34 is a view useful for understanding a pipe end structure of a leading pipe according to an embodiment of the present invention.

A dummy pipe 131, constituting the leading pipe, is propelled from its front end in the pipe jacking direction (left side in FIG. 34) through a side wall of a shaft 130 under the ground. An inner wall of the rear end of an adapter tube 134 is welded with an insertion joint 134a, projecting from the rear end, in the peripheral direction. An inner wall of the adapter tube 134 is welded with a reinforcing ring 134b for preventing a buckling of the adapter tube 134, in the peripheral direction. A rear end of the dummy pipe 131 of which the front end has been propelled underground is welded with the adapter tube 134 mentioned above. An outer pipe 143a is propelled by a jacking apparatus (not illustrated) in such a manner that the insertion joint 134a of the adapter tube 134 enters the inside of the outer pipe 143a, so that a front end of the outer pipe 143a couples with the rear end of the adapter tube 134. A rubber plate 134c is fixed on the right side (in FIG. 34) of the reinforcing ring 134b. The front end of the inner pipe 142 is in contact with the reinforcing ring 134b via the rubber plate 134c. The outer pipe 143a and an inner pipe 142, constituting a propulsion double pipe 141, are relatively slidingly movable. Between the outer pipe 143a and the inner pipe 142, there is provided a grout tube 144 used for filling with concrete (not illustrated) a space between the outer pipe 143a and the inner pipe 142. The inside of the dummy pipe 131 is equipped with cabin units, a television camera, and an indicator, etc. (not illustrated). An excavation disposed on the front end of the dummy pipe 131 is equipped with a crusher head, a shield main body, a direction control jack, and a laser reflector, etc. (not illustrated).

The adapter 134 is welded with the rear end of the dummy pipe 131, after the dummy pipe 131 is propelled underground as shown in FIG. 34. Welding of the end planes of these parts is readily conducted from their exterior. Thus, it is possible to implement the welding in short time. The insertion joint 134a of the adapter tube 134 is inserted inside of the outer pipe 143a, so that the insertion joint 134a serves to perform a positioning of the outer pipe 143a. The reinforcing ring 134b of the adapter tube 134 is in contact with a tip of the inner pipe 142 via the rubber plate 134c, so that the reinforcing ring 134b serves to perform a positioning of the inner pipe 142. Hence, it is avoided such a situation that the reinforcing ring 134b enters the inside of the dummy pipe 131. The use of the rubber plate 134c prevent an occurrence of damage on the inner pipe 142 due to the direct contact of the inner pipe 142 and the reinforcing ring 134b together.

After the double walled pipe 141 arrives at other shaft (not illustrated) located at regular intervals from the shaft 130, the dummy pipe 131 and the adapter tube 134, constituting the leading pipe, are taken off from the double walled pipe 141. When the dummy pipe 131 and the adapter tube 134 are taken off from the double walled pipe 141, according to the present embodiment, it is possible to readily take off the leading pipe from the double walled pipe 141, since the insertion joint 134a of the adapter tube 134 is simply inserted into the outer pipe 143a.

While the reinforcing ring 134b is provided, as described above, for preventing a buckling of the adapter tube 134, the reinforcing ring 134b serves also to perform a positioning of the inner pipe 142. Therefore, according to the present embodiment, the reinforcing ring 134b is adapted to serve as a stopper for positioning the inner pipe 142. While the reinforcing ring 134b is fixed to the adapter tube 134 extending over overall circumference thereof, from the view point that it serves as only the stopper, it is sufficient for the stopper to be fixed to the adapter tube 134 extending over partial extent which permits positioning of the inner pipe 142.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A double walled pipe for pipe jacking method comprising:

an inner pipe; and an outer pipe which is movable relative to said inner pipe in a longitudinal direction of said inner pipe, wherein:
there is provided, between said inner pipe and said outer pipe, a ring member surrounding the periphery of said inner pipe, said ring member being fixed to said inner pipe,
said outer pipe is supported in such a way that it is slidingly movable relative to said ring member, and
said ring member is equipped with a grout hose insertion aperture, and said double walled pipe further comprises a grout hose extending through said grout hose insertion aperture in a longitudinal direction of said double walled pipe.

2. A double walled pipe for pipe jacking method comprising:

an inner pipe; and an outer pipe which is movable relative to said inner pipe in a longitudinal direction of said inner pipe, wherein: there is provided, between said inner pipe and said outer pipe, a ring member surrounding the periphery of said inner pipe, said ring member being fixed to said inner pipe,
said outer pipe is supported in such a way that it is slidingly movable relative to said ring member,
said ring member is equipped with an insertion opening into which a grout hose insertion tube is inserted, and
said double walled pipe further comprises a grout hose insertion tube having a filling material flow hole, extending through said insertion opening in a longitudinal direction of said double walled pipe.

3. A double walled pipe for pipe jacking method comprising:

an inner pipe; and an outer pipe which is movable relative to said inner pipe in a longitudinal direction of said inner pipe, wherein:
there is provided, between said inner pipe and said outer pipe, a ring member surrounding the periphery of said inner pipe, said ring member being fixed to said inner pipe,
said outer pipe is supported in such a way that it is slidingly movable relative to said ring member,
said ring member is equipped with an insertion opening into which a grout hose insertion tube is inserted,
said double walled pipe further comprises a grout hose insertion tube having a filling material flow hole, extending through said insertion opening in a longitudinal direction of said double walled pipe, and
said grout hose insertion tube is equipped with said filling material flow hole at the front end portion and/or the back end portion of said grout hose insertion tube.

4. A jacking method of propelling underground through a side wall of a shaft a double walled pipe comprising an inner pipe, and an outer pipe which is movable relative to said inner pipe in a longitudinal direction of said inner pipe, comprising the steps of:

connecting a back end portion of an inner pipe of a preceding double walled pipe of which a rear end projects to the shaft with a from end portion of an inner pipe of a subsequent double walled pipe to be newly propelled;

moving forwards said outer pipe of the subsequent double walled pipe with respect to said inner pipe to couple a front end plane of said outer pipe of the subsequent double walled pipe with a back end plane of said outer pipe of the preceding double walled pipe; and propelling underground the subsequent double walled pipe upon applying a propelling power on said outer pipe of the subsequent double walled pipe, but applying no propelling power on said inner pipe of the subsequent double walled pipe.

5. A jacking method according to claim 4, wherein said double walled pipe further comprising a material, provided between said inner pipe and said outer pipe, for covering the periphery of said inner pipe in such a manner that the front end portion and back end portion of said inner pipe are exposed, and a grout hose insertion hole extending in a longitudinal direction, said method further comprising the steps of:

connecting a rear end of a grout hose exposed from an opening of a back end of said grout hose insertion hole of a preceding double walled pipe with a tip of a grout hose exposed from an opening of a front end of said grout hose insertion hole of a subsequent double walled pipe, said grout hose connection step being conducted between said inner pipe connection step and said outer pipe moving step; and filling with a filling material a space between said inner pipes and said outer pipes of the connected double walled pipes each other, by means of slushing the filling material into the connected grout hoses each other, after repetition of said inner pipe connection step, said grout hose connection step, said outer pipe moving step and said pipe propelling step in connection with a plurality of said double walled pipes.

6. A jacking method according to claim 5, wherein in said filling step, the filling is executed in such a manner that while the connected grout hoses each other are sequentially drawn, the rear end of the grout hoses is sequentially positioned at the connected portions of said connected double walled pipes so that the connected portions are filled with the filling material.

7. A jacking method according to claim 6, wherein in mid course of the repetition of said inner pipe connection step, said grout hose connection step, said outer pipe moving step and said pipe propelling step in connection with a plurality of said double walled pipes, there is set up, after said inner pipe connection step, a step of executing said outer pipe moving step omitting said grout hose connection step; and wherein in said filling step, the grout hoses are drawn from both sides of the front and rear of pipe jacking direction.

8. A jacking method according to claim 6, wherein said inner pipe connection step, said outer pipe moving step and said pipe propelling step are repeatedly executed in connection with a plurality of said double walled pipes, so that there is formed such a state that a back end portion of an outer pipe of said double walled pipe finally coupled is exposed in said shaft while said inner pipe is projected by a predetermined length from the back end portion of said outer pipe;

the back end portion of said double walled pipe finally coupled, which takes said state, is capped with a protection cap of which one end is closed with a cover, said protection tube having a diameter same as the outer pipe and a depth exceeding said predetermined length;

a bearing wall is constructed for covering the back end portion of said double walled pipe finally coupled, which takes said state, and said protection cap with which said back end portion is capped, said bearing wall being contact with said side wall; and said inner pipe connection step, said outer pipe moving step and said pipe jacking step are repeatedly executed in connection with a plurality of said subsequent double walled pipes, while causing said bearing wall to bear a reaction force of a propulsion, so that the plurality of said subsequent double walled pipes are propelled underground from a side wall which is located over against said side wall.

9. A jacking method according to claim 8, wherein before the back end portion of said double walled pipe finally coupled, which takes said state, is capped with the protection tube, a back end portion of an inner pipe of said double walled pipe finally coupled is capped with a protection cap which is spaced from the protection tube when installed.

10. A double walled pipe for pipe jacking method comprising:

an inner pipe; and an outer pipe which is movable relative to said inner pipe in a longitudinal direction of said inner pipe, wherein:

a front end portion or a back end portion of said outer pipe is equipped with a guide member for guiding a tip of said outer pipe to be moved relative to said inner pipe, said guide member being adapted to conduct an effective coupling of a preceding double walled pipe with a subsequent double walled pipe, said guide member includes:

a ring member having a pan inserted into one end of said outer pipe and fixed to said outer pipe and other part to be inserted into another outer pipe which is to be coupled with said outer pipe, said other part being projected from said outer pipe in a longitudinal direction of said outer pipe and being provided with a groove surrounding the periphery of the ring member, wherein said ring member is formed, at a tip end to be inserted into said other outer pipe, with a taper section which is gradually reduced toward the tip end; and an O-ring having a flexibility for sealing a coupling portion of outer pipe-to-outer pipe, said O-ring being engaged with said groove, and said outer pipe is equipped with a check valve for permitting a one-way flow from an interior of said outer pipe towards an exterior.

11. A double walled pipe for pipe jacking method comprising:

an inner pipe; and an outer pipe which is movable relative to said inner pipe in a longitudinal direction of said inner pipe, wherein:

a front end portion or a back end portion of said outer pipe is equipped with a guide member for guiding a tip of said outer pipe to be moved relative to said inner pipe, said guide member being adapted to conduct an effective coupling of a preceding double walled pipe with a subsequent double walled pipe, said guide member includes:

a ring member having a part inserted into one end of said outer pipe and fixed to said outer pipe and other part to be inserted into another outer pipe which is to be coupled with said outer pipe, said other part being projected from said outer pipe in a longitudinal direction of said outer pipe and being provided with a groove surrounding the periphery of the ring member, wherein said ring member is formed, at a tip end to be inserted into said other outer pipe, with a taper section which is continuously reduced in its outside diameter toward the tip end; and an O-ring having a flexibility for sealing a coupling portion of outer pipe-to-outer pipe, said O-ring being engaged with said groove, and said outer pipe is equipped with a check valve for permitting a one-way flow from an interior of said outer pipe towards an exterior.

* * * * *